US012560738B2

(12) United States Patent
Haugvaldstad et al.

(10) Patent No.: US 12,560,738 B2
(45) Date of Patent: Feb. 24, 2026

(54) SYSTEM METHOD AND APPARATUS FOR DETECTING DOWNHOLE FEATURES

(71) Applicant: Schlumberger Technology Corporation, Sugar Land, TX (US)

(72) Inventors: Kjell Haugvaldstad, Vanvikan (NO); Harry Cook, Cambridge (GB); John Mervyn Cook, Cambridge (GB); Jonathan Robert Hird, Cambridge (GB); Jonathan Dunlop, Cambridge (GB); David White, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/664,546

(22) Filed: May 15, 2024

(65) Prior Publication Data

US 2024/0385346 A1 Nov. 21, 2024

Related U.S. Application Data

(60) Provisional application No. 63/502,136, filed on May 15, 2023.

(51) Int. Cl.
| | |
|---|---|
| *G01V 11/00* | (2006.01) |
| *E21B 44/00* | (2006.01) |
| *E21B 47/07* | (2012.01) |
| *E21B 49/00* | (2006.01) |

(52) U.S. Cl.
CPC ............ *G01V 11/002* (2013.01); *E21B 44/00* (2013.01); *E21B 47/07* (2020.05); *E21B 49/00* (2013.01)

(58) Field of Classification Search
CPC ....... G01V 11/002; E21B 47/07; E21B 44/00; E21B 49/00
See application file for complete search history.

(56) References Cited

U.S. PATENT DOCUMENTS

| | | |
|---|---|---|
| 4,181,360 A | 1/1980 | Wilson |
| 4,359,900 A | 11/1982 | Garney |
| 5,720,355 A | 2/1998 | Lamine |
| 6,230,822 B1 | 5/2001 | Sullivan |
| 6,419,032 B1 | 7/2002 | Sullivan |

(Continued)

FOREIGN PATENT DOCUMENTS

| | | |
|---|---|---|
| CN | 101832130 A | 9/2010 |

OTHER PUBLICATIONS

International Search Report and Written Opinion of International Patent Application PCT/US2024/029390 issued on 30August24, 11 pages.

(Continued)

*Primary Examiner* — Dany E Akakpo
(74) *Attorney, Agent, or Firm* — Kyle R. Miiller

(57) ABSTRACT

A method of identifying a geothermal reservoir of an earth formation comprises receiving engagement data from an engagement sensor. The engagement data corresponds to an engagement of the instrumented engagement element with a borehole in the earth formation. The method includes identifying environment data from an environment sensor. The environment data corresponds to a downhole environment of the engagement data. The method includes mapping the engagement data to the environment data to generate mapped engagement data.

19 Claims, 19 Drawing Sheets

(56) References Cited

U.S. PATENT DOCUMENTS

| | | | |
|---|---|---|---|
| 6,540,033 | B1 | 4/2003 | Sullivan |
| 6,543,312 | B2 | 4/2003 | Sullivan |
| 6,626,251 | B1 | 9/2003 | Sullivan |
| 7,497,276 | B2 | 3/2009 | Pastusek |
| 7,506,695 | B2 | 3/2009 | Pastusek |
| 7,510,026 | B2 | 3/2009 | Pastusek |
| 7,604,072 | B2 | 10/2009 | Pastusek |
| 7,946,357 | B2 | 5/2011 | Trinh |
| 8,162,077 | B2 | 4/2012 | Glasgow |
| 8,695,729 | B2 | 4/2014 | Kumar |
| 8,746,367 | B2 | 6/2014 | DiGiovanni |
| 8,757,291 | B2 | 6/2014 | Kumar |
| 8,807,242 | B2 | 8/2014 | Cheng |
| 9,045,972 | B2 | 6/2015 | Cheng |
| 9,145,741 | B2 | 9/2015 | Trinh |
| 9,297,248 | B2 | 3/2016 | Yao |
| 9,500,070 | B2 | 11/2016 | DiGiovanni |
| 9,695,683 | B2 | 7/2017 | Kumar |
| 9,739,093 | B2 | 8/2017 | Trinh |
| 10,072,492 | B2 | 9/2018 | DiGiovanni |
| 10,662,769 | B2 | 5/2020 | Kumar |
| 11,111,731 | B2 | 9/2021 | Cao |
| 11,180,989 | B2 | 11/2021 | Cao |
| 11,199,082 | B2 | 12/2021 | DeVries |
| 11,668,185 | B2 | 6/2023 | Zhan |
| 11,828,165 | B2 | 11/2023 | Zhan |
| 12,123,261 | B1 | 10/2024 | Clark |
| 12,305,506 | B1 | 5/2025 | Cook |
| 2004/0222018 | A1 | 11/2004 | Sullivan |
| 2011/0024188 | A1 | 2/2011 | Wassell |
| 2011/0266058 | A1 | 11/2011 | Kumar |
| 2012/0272724 | A1 | 11/2012 | Hollmann |
| 2012/0279783 | A1 | 11/2012 | Trinh et al. |
| 2013/0048381 | A1 | 2/2013 | Habernal |
| 2015/0114627 | A1* | 4/2015 | Tjhang .................. E21B 49/10 166/250.01 |
| 2015/0129230 | A1* | 5/2015 | Carlson ................ E21B 43/263 166/308.1 |
| 2016/0194951 | A1 | 7/2016 | Hay |
| 2016/0290130 | A1 | 10/2016 | Neale et al. |
| 2017/0103554 | A1 | 4/2017 | Elkington |
| 2017/0275951 | A1 | 9/2017 | Thomas |
| 2019/0106979 | A1 | 4/2019 | Nabors |
| 2020/0011171 | A1 | 1/2020 | Cao |
| 2020/0095831 | A1 | 3/2020 | Etebu |
| 2020/0278473 | A1 | 9/2020 | Likins, Jr. et al. |
| 2020/0308955 | A1 | 10/2020 | Hird et al. |
| 2021/0301641 | A1* | 9/2021 | Dunbar .................. E21B 45/00 |
| 2022/0381675 | A1 | 12/2022 | Haiz |
| 2023/0015853 | A1 | 1/2023 | Wort |
| 2023/0124575 | A1 | 4/2023 | Moeny |
| 2023/0296013 | A1 | 9/2023 | Lanning |
| 2023/0333274 | A1* | 10/2023 | Tian ........................ G01V 1/48 |
| 2024/0102378 | A1 | 3/2024 | Nielsen |
| 2024/0384646 | A1 | 11/2024 | Haugvaldstad |
| 2024/0384652 | A1 | 11/2024 | Haugvaldstad |

OTHER PUBLICATIONS

Dunlop, J. et al., "Increased Rate of Penetration Through Automation", SPE-139897, presented at the SPE-IADC Drilling Conference and Exhibition, Amsterdam, The Netherlands, 2011, 11 pages.

* cited by examiner

210

213

214

215

216

Downhole Tool Rotation
(degrees)

1260

Receive engagement data — 1261

Receive environment data from environment sensor — 1262

Map engagement data to environment data to generate mapped engagement data — 1263

1460

Receive engagement data  1461

Detect downhole dynamic of downhole tool  1462

1560

Receive first engagement data — 1561

Receive second engagement data — 1562

Map first engagement data to second engagement data — 1563

1600

Memory _1603_

Instructions _1605_

Data _1607_

Processor _1601_

Communication Interface(s) _1609_

Input Device(s) _1611_

Output Device(s) _1613_

Display Device _1615_

Display Controller _1617_

1619

SYSTEM METHOD AND APPARATUS FOR DETECTING DOWNHOLE FEATURES

CROSS-REFERENCE TO RELATED APPLICATION(S)

The present disclosure is the National Stage Entry of International Application No. PCT/US2024/029390, filed on May 15, 2024, which claims priority from U.S. Provisional Application No. 63/502,136, filed on May 15, 2023, herein incorporated by reference in its entirety.

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be formed in earthen formations using earth-boring tools such as drill bits for drilling wellbores and reamers for enlarging the diameters of wellbores.

Wellbores can extend deep into the earth, often up to several kilometers. It is important and often difficult to accurately detect and map features of the geological formations to identify sources of oil, gas, or other valuable resources. For example, conventional techniques often implement imaging tools to measure various parameters of the surrounding rock, tools for collecting and removing samples of the earth formation for analyzing at the surface, and tools for detecting various downhole dynamics of the drilling system.

Some conventional tools can be expensive to operate, in part due to the fact that they can typically only be used when the well is not actively drilling. Some conventional tools may be implemented as part of a drilling tool assembly and/or while drilling. However, these tools are typically located a significant distance uphole of downhole tools that actively engage or cut the formation. Due to this, measurements from some conventional tools can have limited usefulness, for example, for determining or characterizing downhole dynamics as a downhole (engagement) tool interacts with the formation and/or taking measurements proximate a point of engagement of a downhole (engagement) tool. Additionally, the measurements (or images) from some conventional tools can have limited accuracy and/or resolution limiting their usefulness and/or the ability to detect and/or characterize geological features and/or downhole dynamics.

Thus, improved methods, systems, and devices for imaging the wellbore and/or mapping the earth formation while drilling, as well as for detecting downhole dynamics can have significant advantages over conventional techniques.

SUMMARY

In some embodiments, a method of identifying a geothermal reservoir of an earth formation includes receiving engagement data from an engagement sensor implemented on an instrumented engagement element of a downhole tool. The engagement data corresponds to an engagement of the instrumented engagement element with a borehole in the earth formation. The method includes identifying environment data from an environment sensor. The environment data corresponds to a downhole environment of the engagement data. The method includes mapping the engagement data to the environment data to generate mapped engagement data.

In other embodiments, a method of determining a geological feature of an earth formation includes receiving sensor data from a downhole sensor implemented on an instrumented engagement element of a downhole tool. The sensor data corresponds to an engagement of the instrumented engagement element with a borehole of the earth formation. The method further includes defining a data feature in the sensor data. The method further includes determining a bedding plane of the earth formation based on identifying one or more instances of the data feature that occurs periodically with respect to a rotation of the downhole tool. The data feature occurs each period with respect to a plurality of rotations of the downhole tool, and the bedding plane has a formation dip.

In yet other embodiments, a method of determining downhole dynamics of a drilling system includes receiving engagement data from an engagement sensor implemented on an instrumented engagement element of a downhole tool. The engagement data corresponds to an engagement of the instrumented engagement element with a borehole of the earth formation. The method further includes detecting a downhole dynamic of the downhole tool based on identifying a data feature in the engagement data.

In yet other embodiments, a method of determining downhole dynamics of a drilling system includes receiving first engagement data from a first engagement sensor implemented on a first engagement element of a downhole tool. The first engagement data corresponds to a first engagement of the first instrumented engagement element with a borehole in the earth formation. The method further includes receiving second engagement data from a second engagement sensor implemented on a second engagement element of a downhole tool, the second engagement data corresponds to a second engagement of the second instrumented engagement element with the borehole. The method further includes mapping the first engagement data to the second engagement data to generate mapped engagement data.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some

Figure 1:
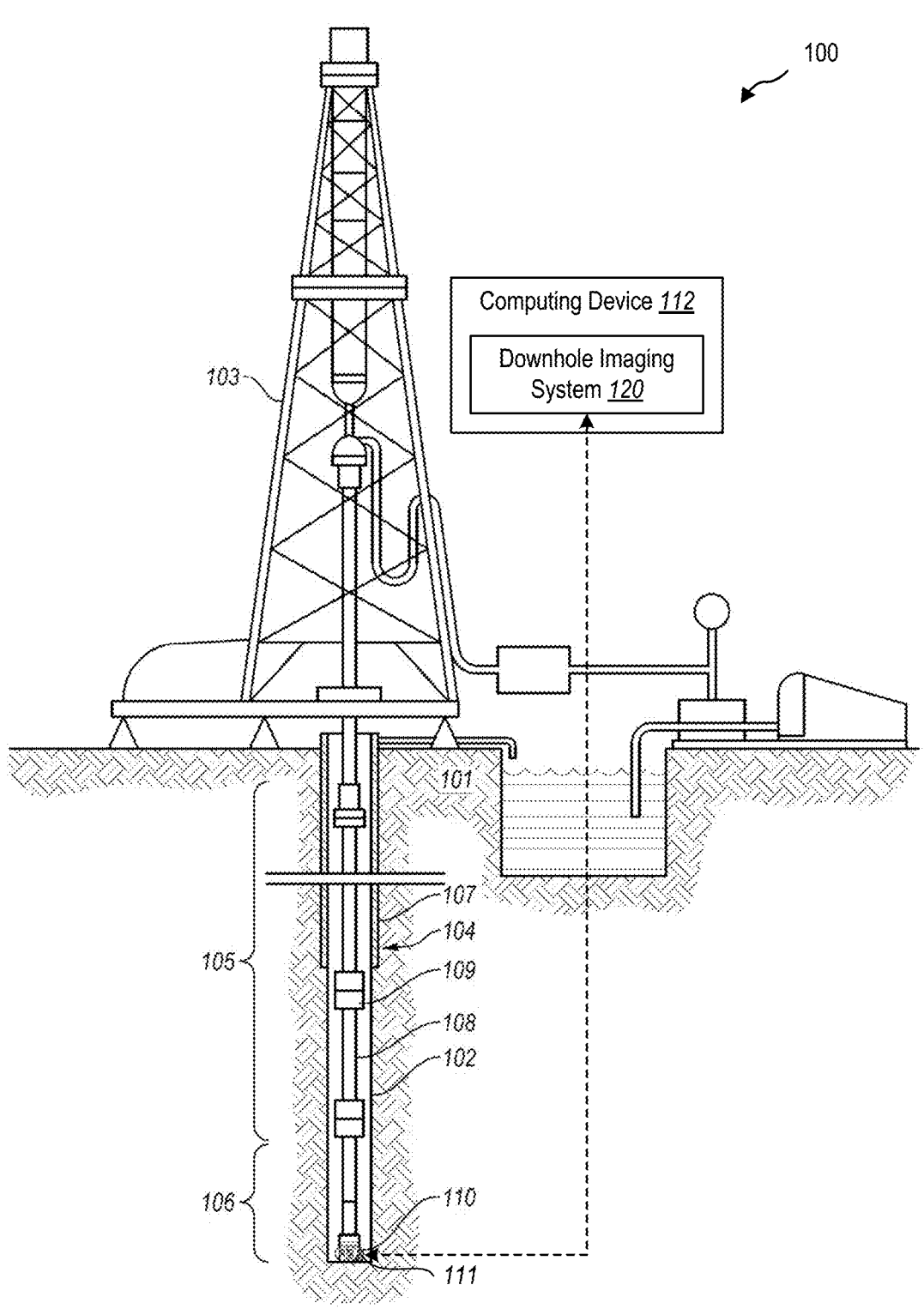
Figure 2:
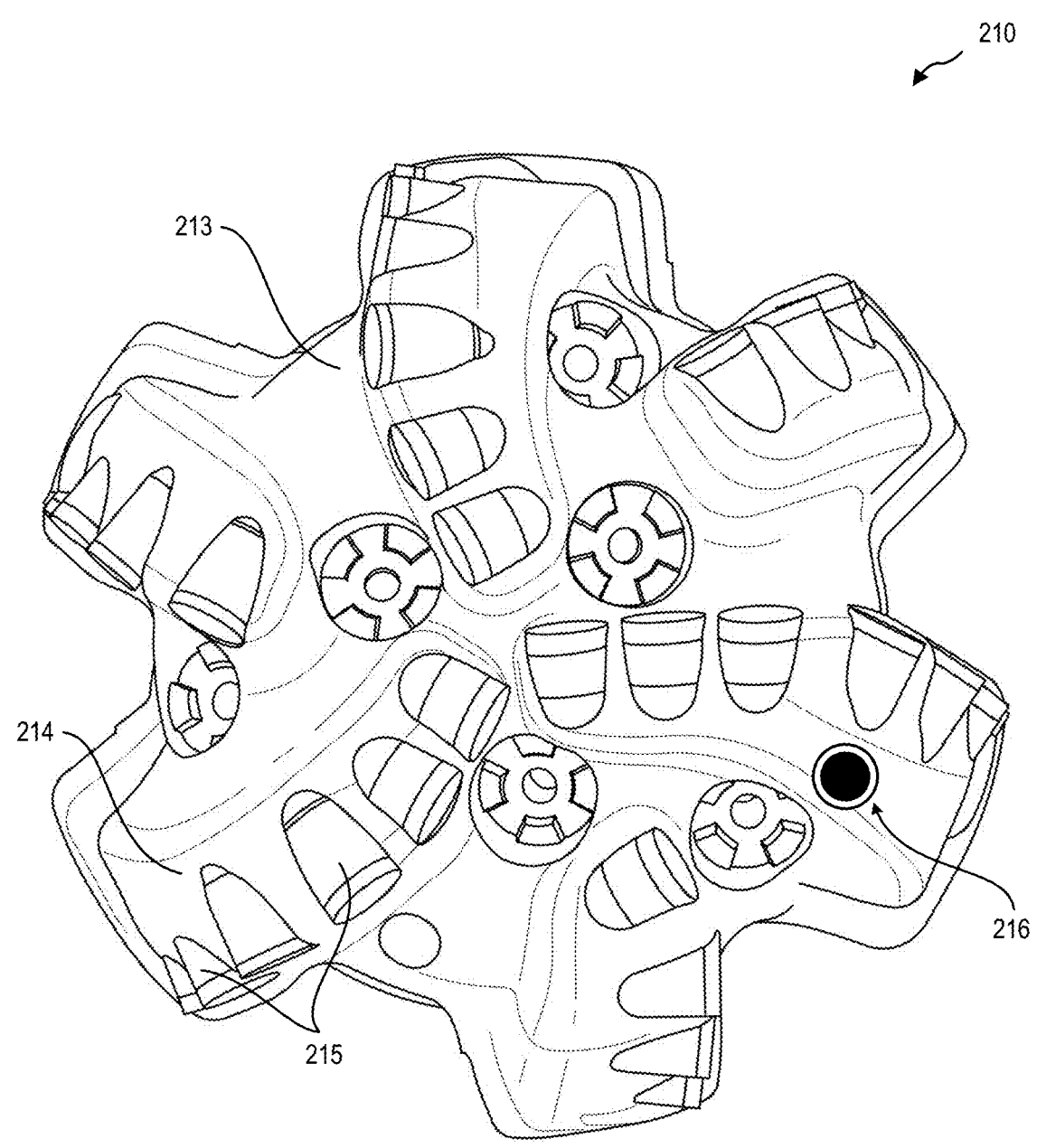
Figure 3:
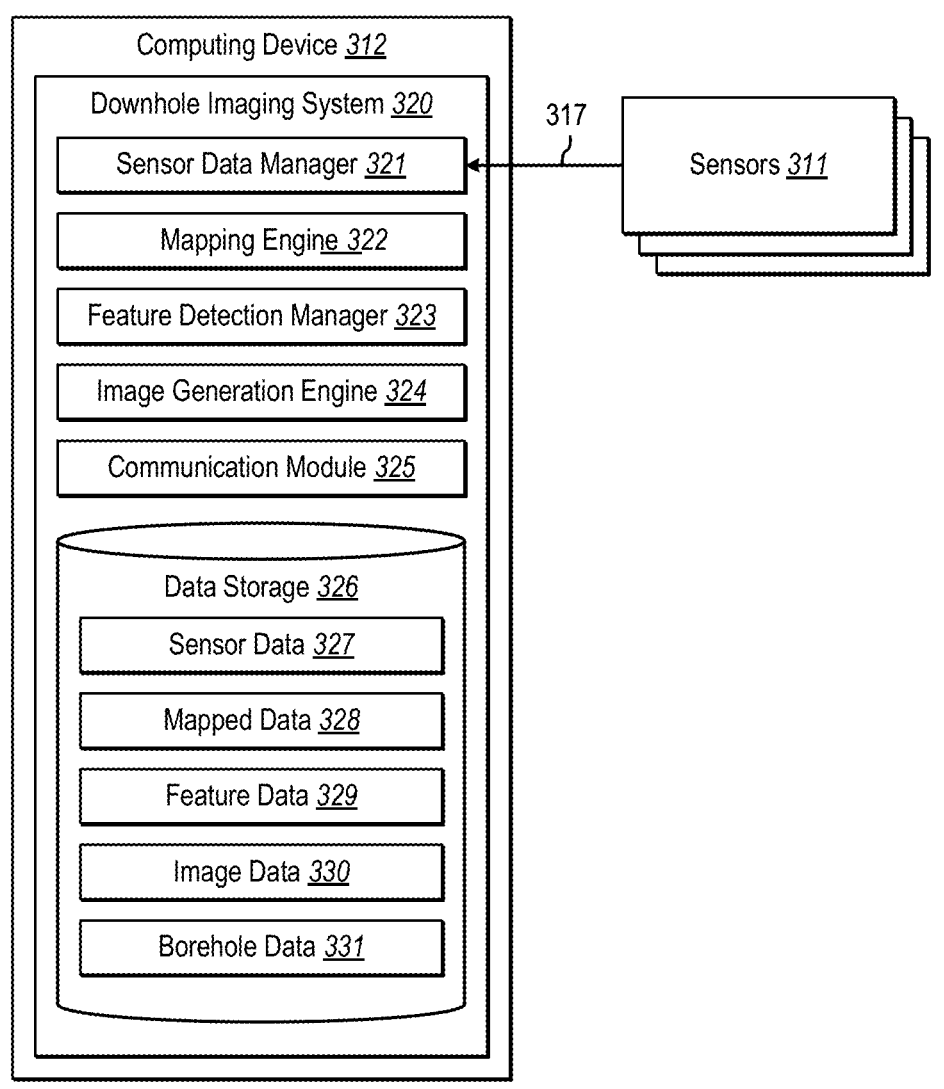
Figure 4:
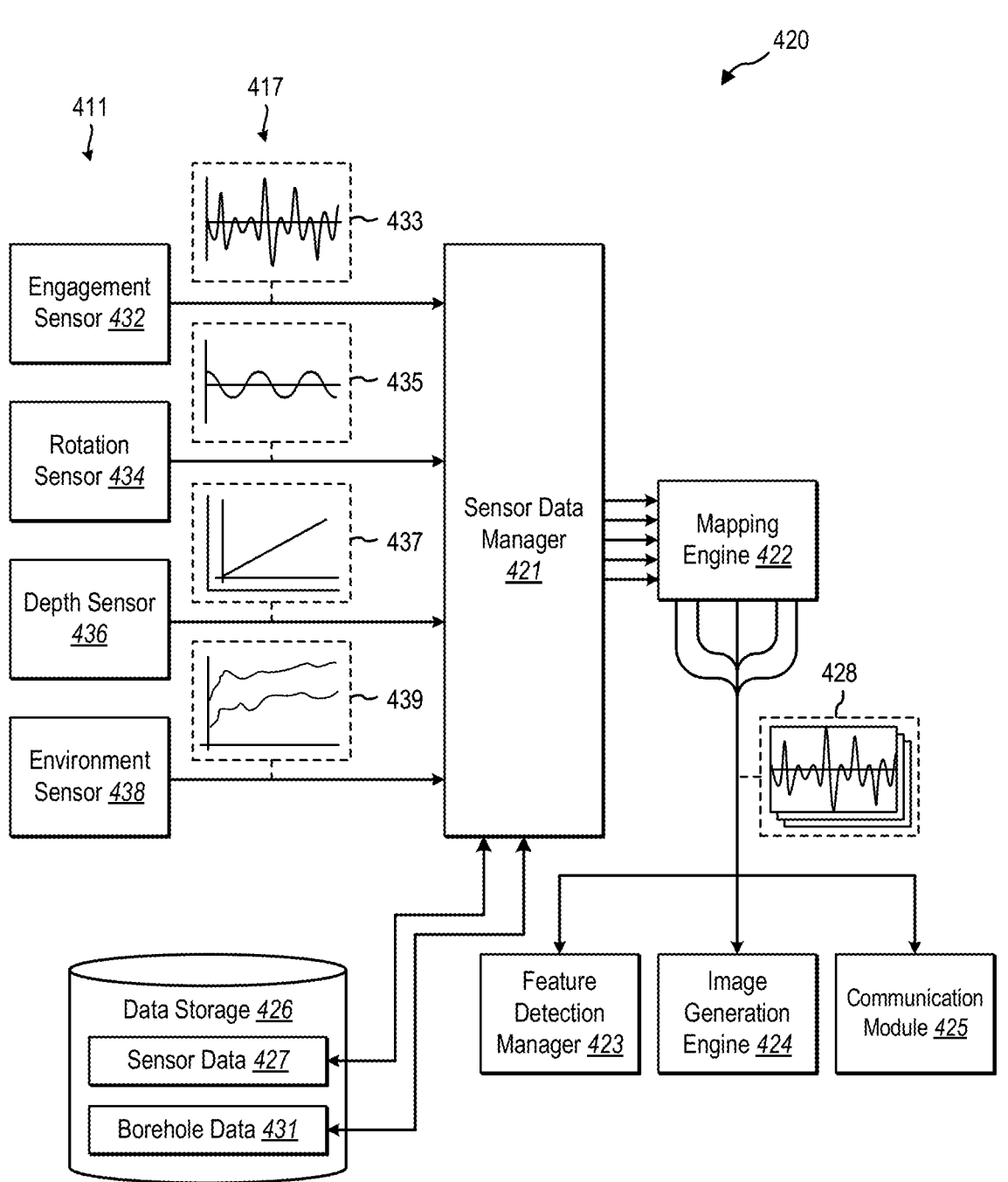
Figure 5:
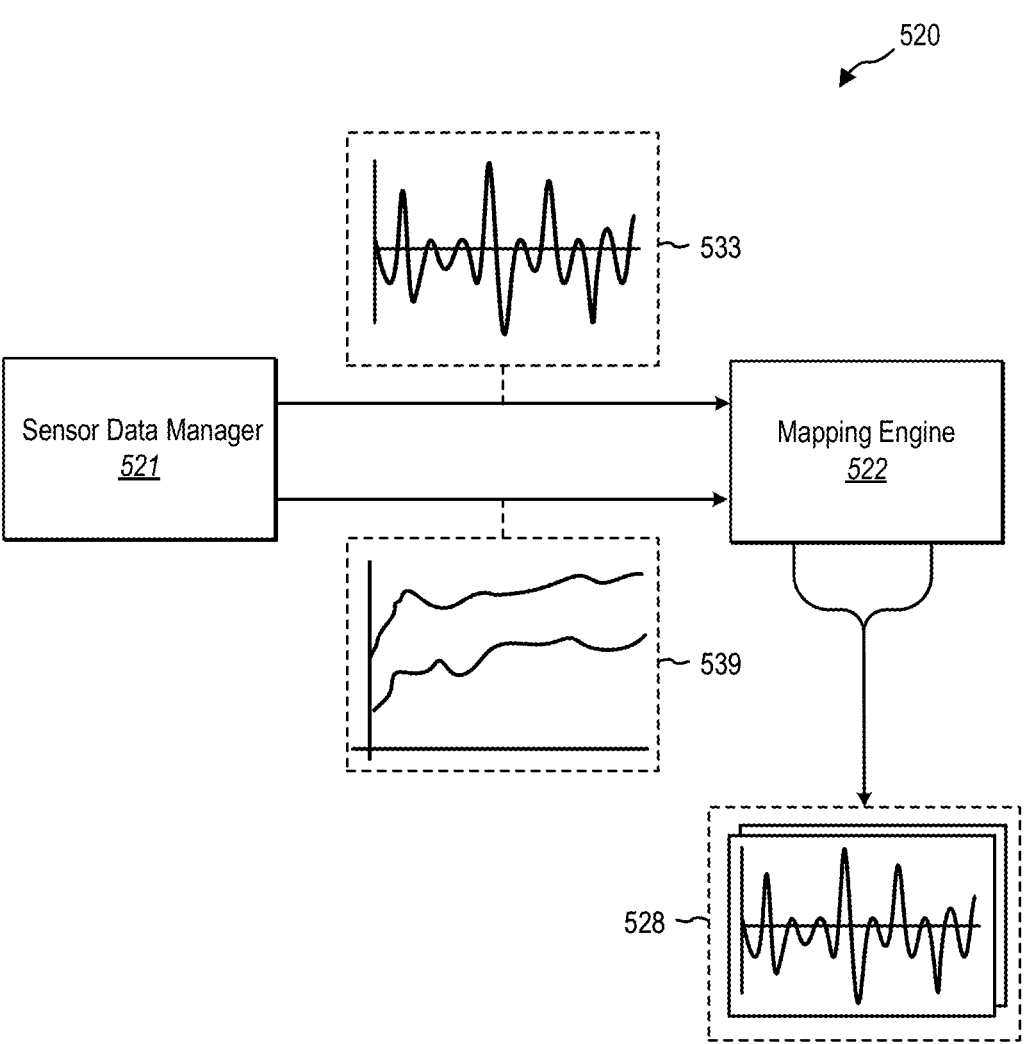
Figure 6:
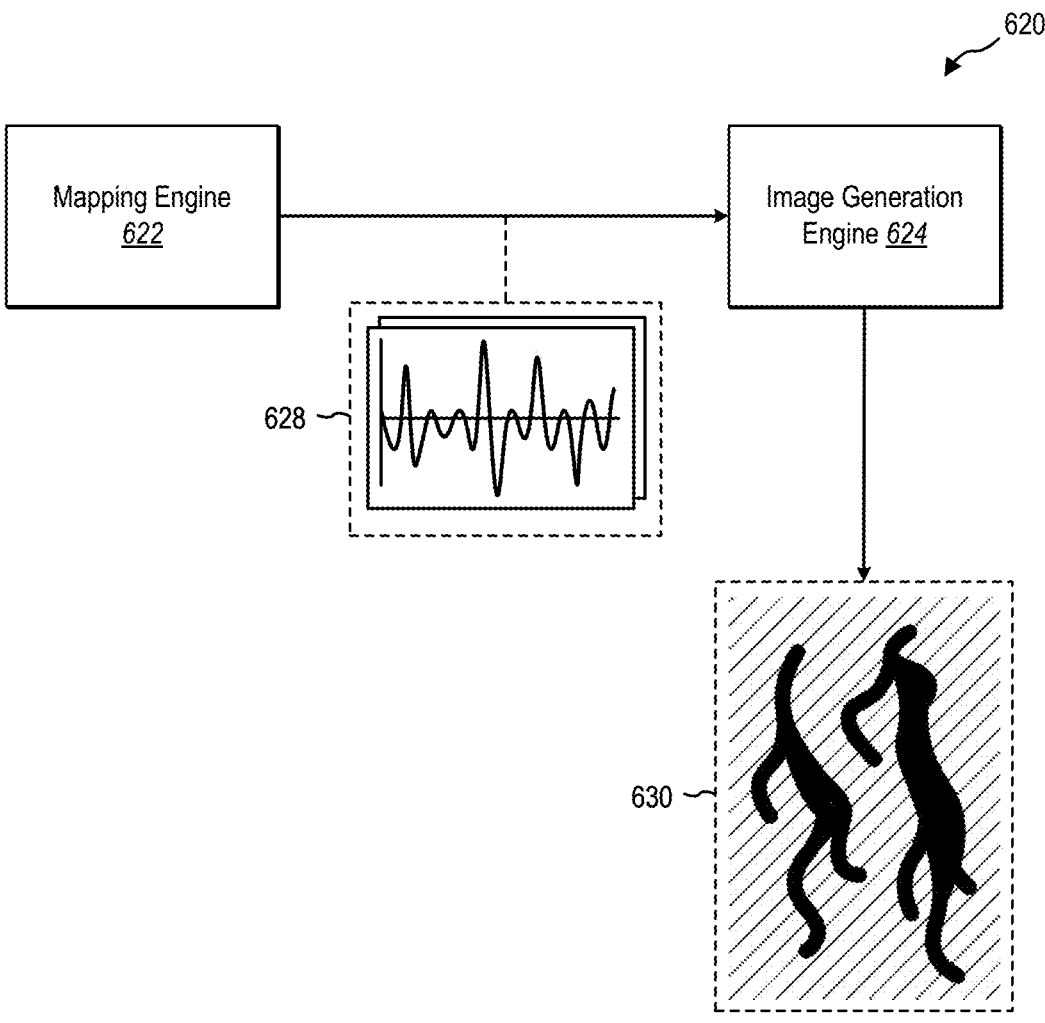
Figures 1, 7:
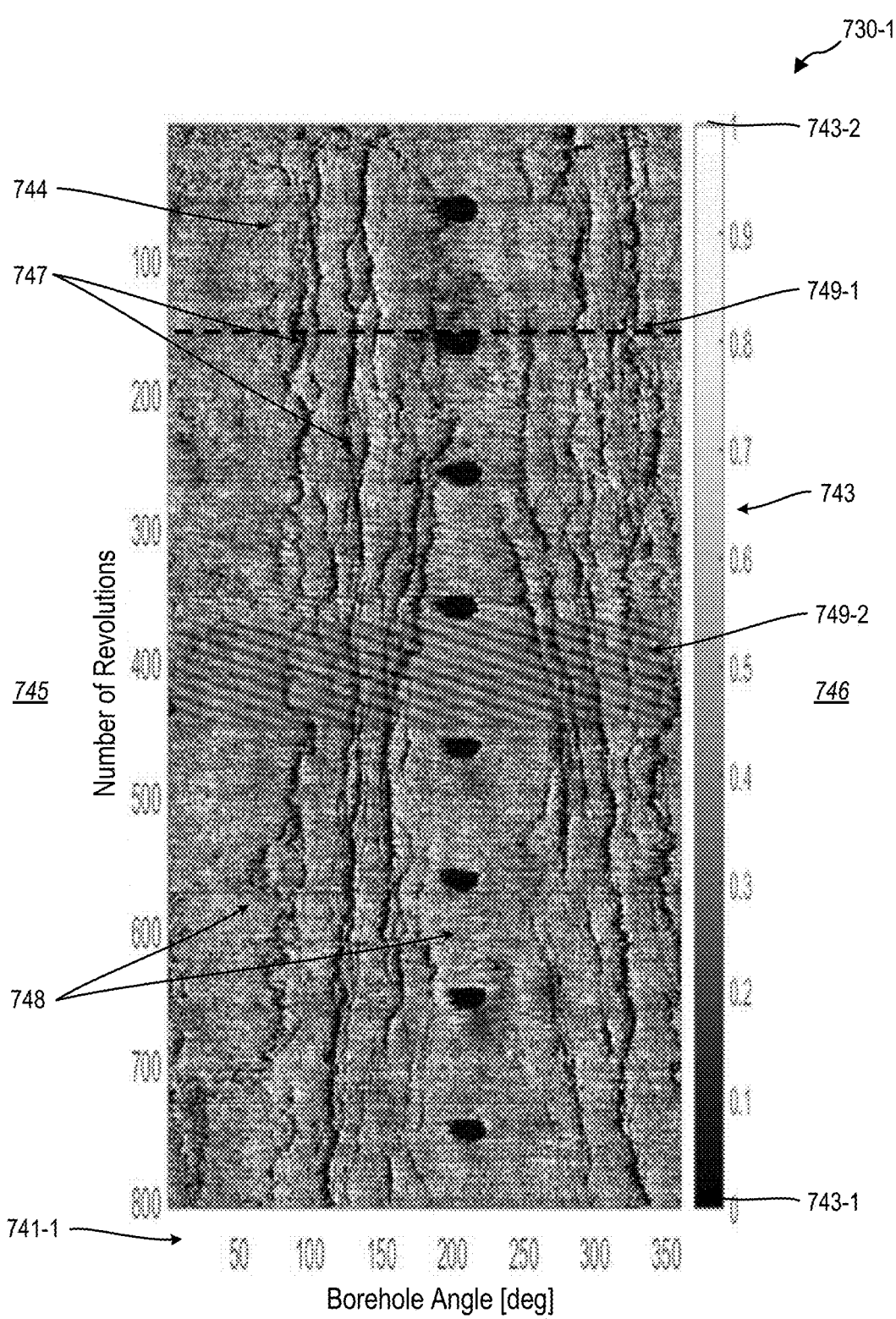
Figures 2, 7:
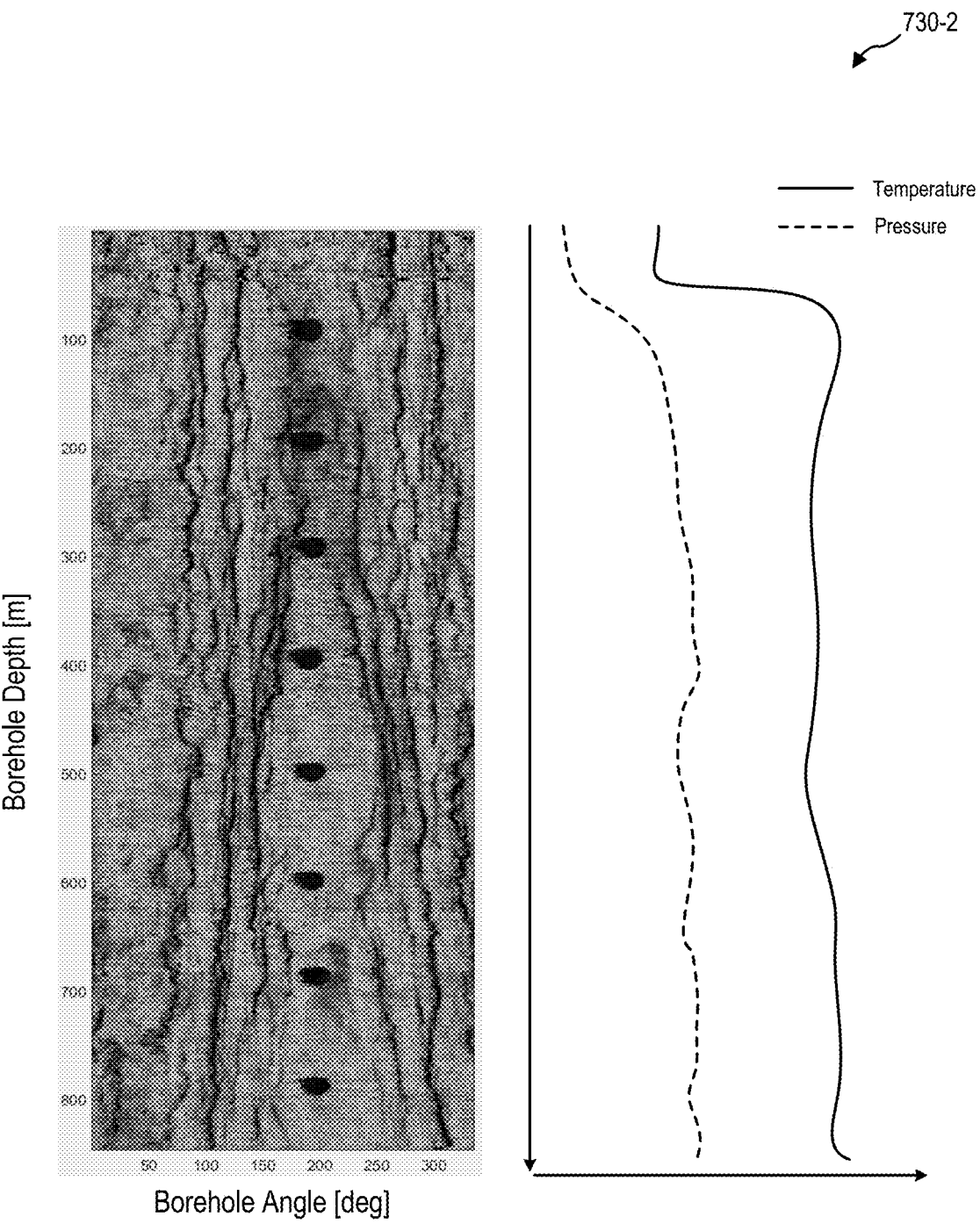
Figures 3, 7:
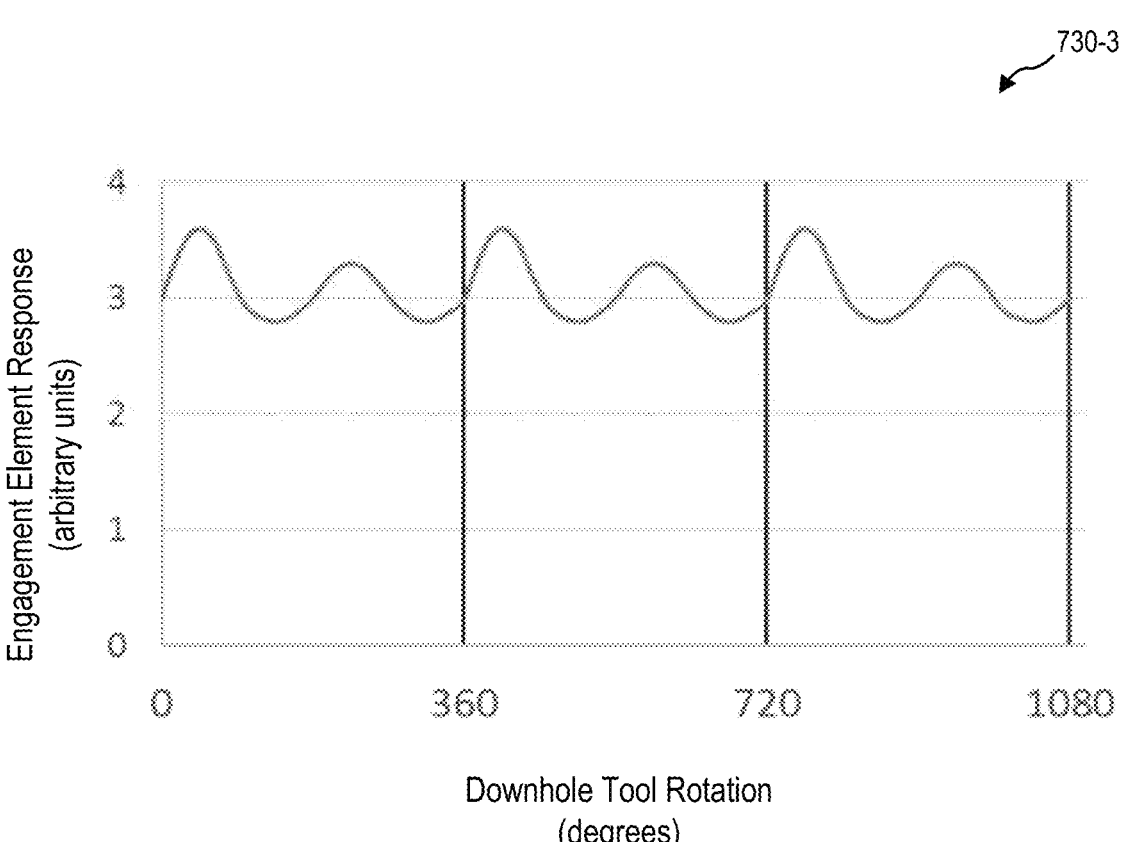
Figure 8:
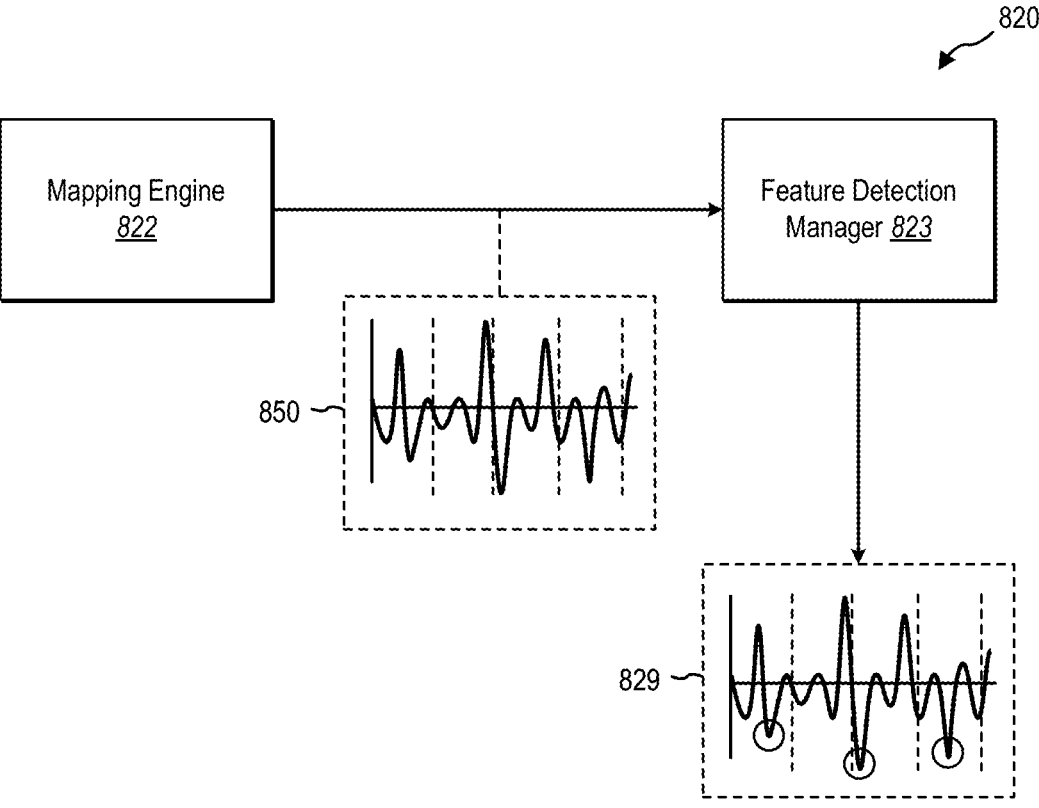
Figures 1, 9:
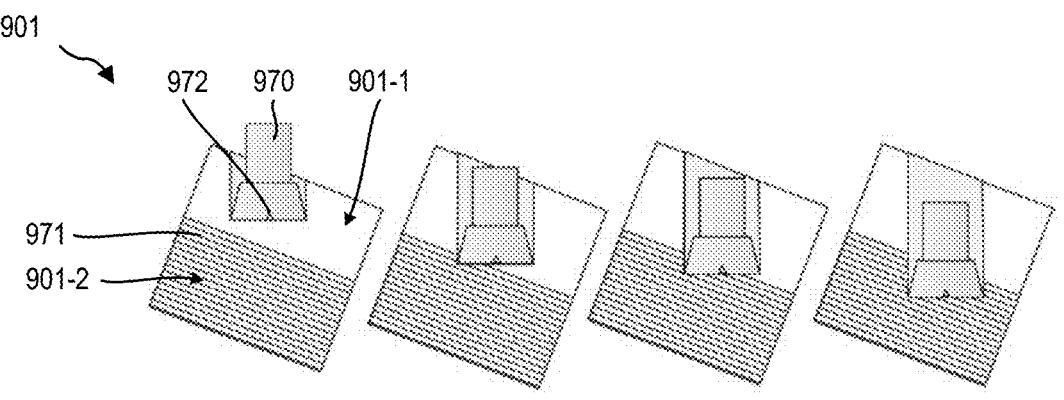
Figures 2, 9:
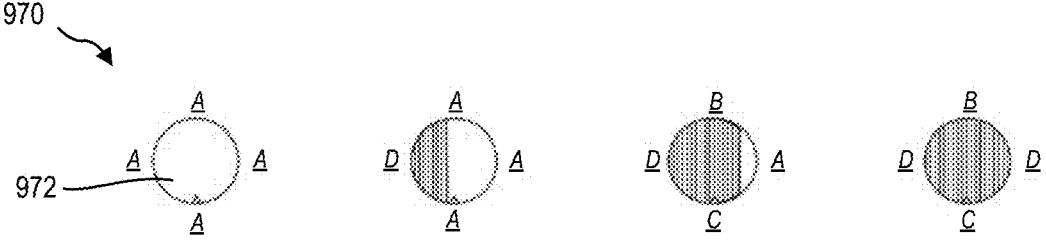
Figures 3, 9:
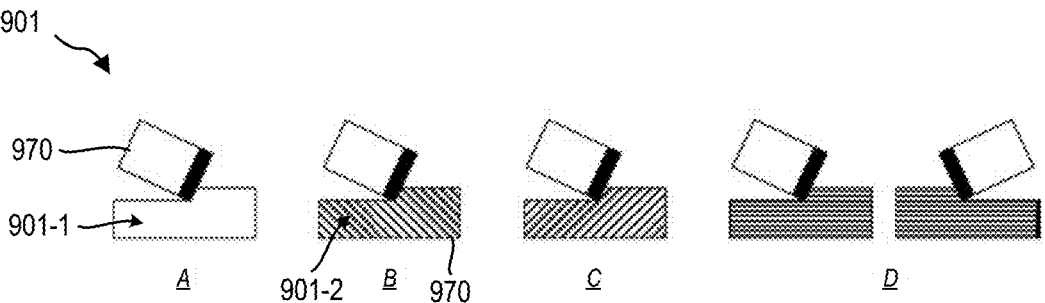
Figures 4, 9:
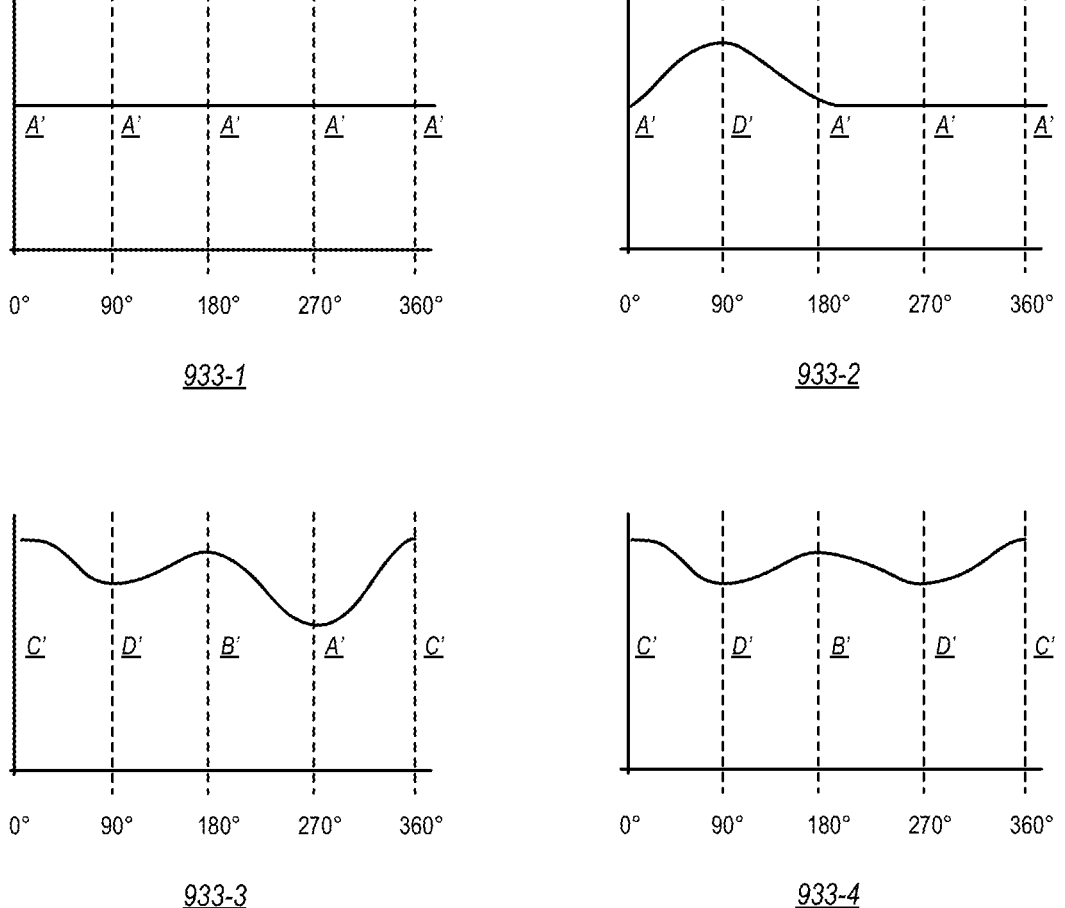
Figure 10:
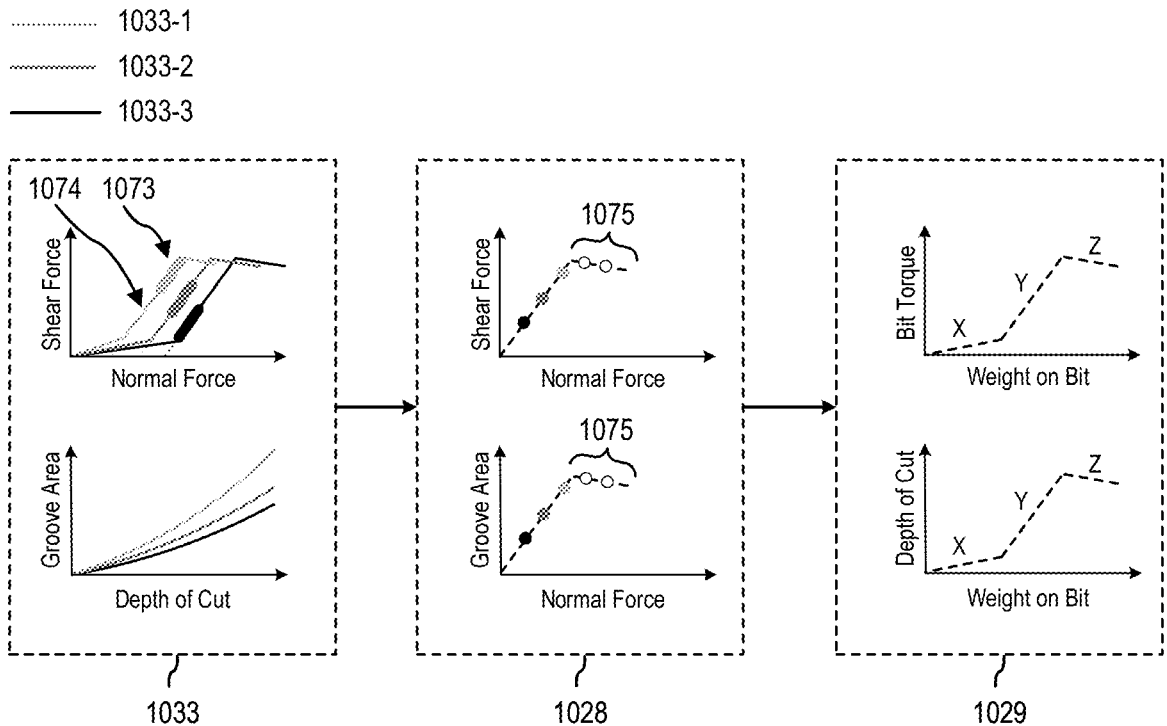

3 of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1 shows one embodiment of a drilling system for drilling an earth formation to form a wellbore, according to at least one embodiment of the present disclosure;

FIG. 2 is a bottom view of a downhole end of an embodiment of a bit, according to at least one embodiment of the present disclosure;

FIG. 3 illustrates an example computing device having a downhole imaging system implemented thereon, according to at least one embodiment of the present disclosure;

FIG. 4 illustrates an example flow of information between components of a downhole imaging system, according to at least one embodiment of the present disclosure;

FIG. 5 illustrates an example flow of information between components of a downhole imaging system, according to at least one embodiment of the present disclosure;

FIG. 6 illustrates an example flow of information between components of a downhole imaging system, according to at least one embodiment of the present disclosure;

FIGS. 7-1 to 7-3 are example image data generated by an image generation engine of a downhole imaging system according to at least one embodiment of the present disclosure;

FIG. 8 illustrates an example flow of information between components of a downhole imaging system, according to at least one embodiment of the present disclosure;

FIG. 9-1 includes example side views of a downhole tool engaging an earth formation, according to at least one embodiment of the present disclosure;

FIG. 9-2 illustrates example top-down schematic views of the rotation of an engagement element of a downhole tool, corresponding to the various views of FIG. 9-1;

FIG. 9-3 illustrates example cross-section views of an engagement element engaging an earth formation corresponding with the various views of FIGS. 9-1 and 9-2;

FIG. 9-4 illustrates example engagement data corresponding to the various views of FIGS. 9-1 to 9-3;

FIG. 10 illustrates an example technique for determining downhole dynamics based on example engagement data, according to at least one embodiment of the present disclosure.

Figure 11:
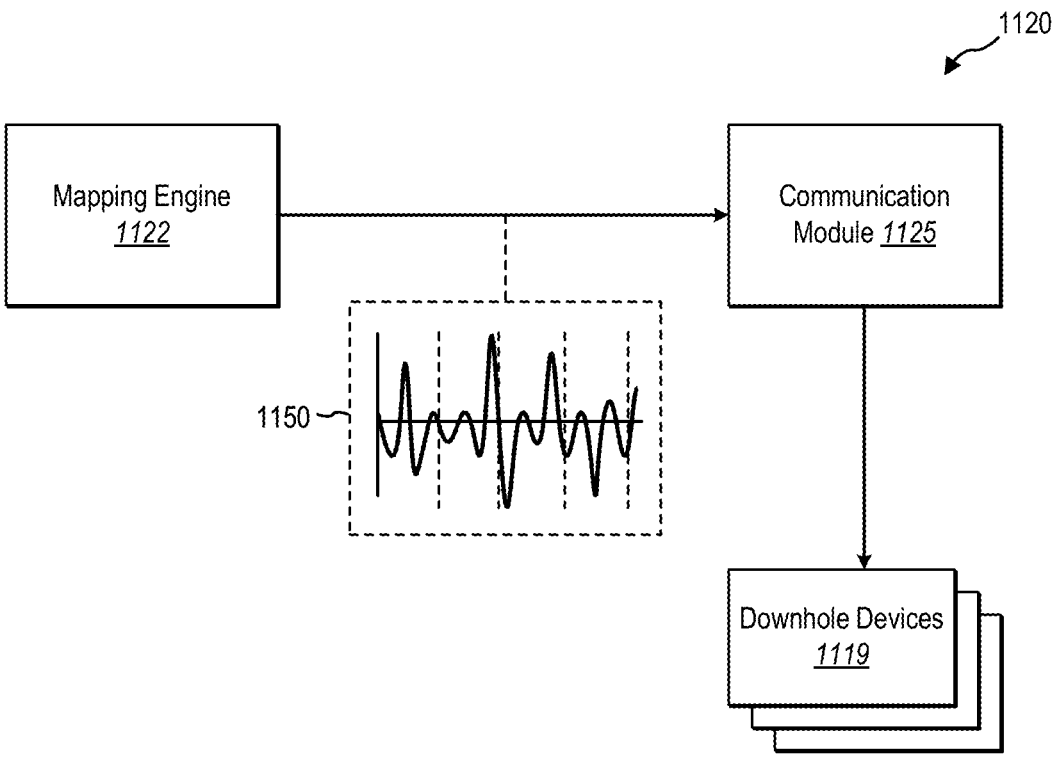
Figure 12:
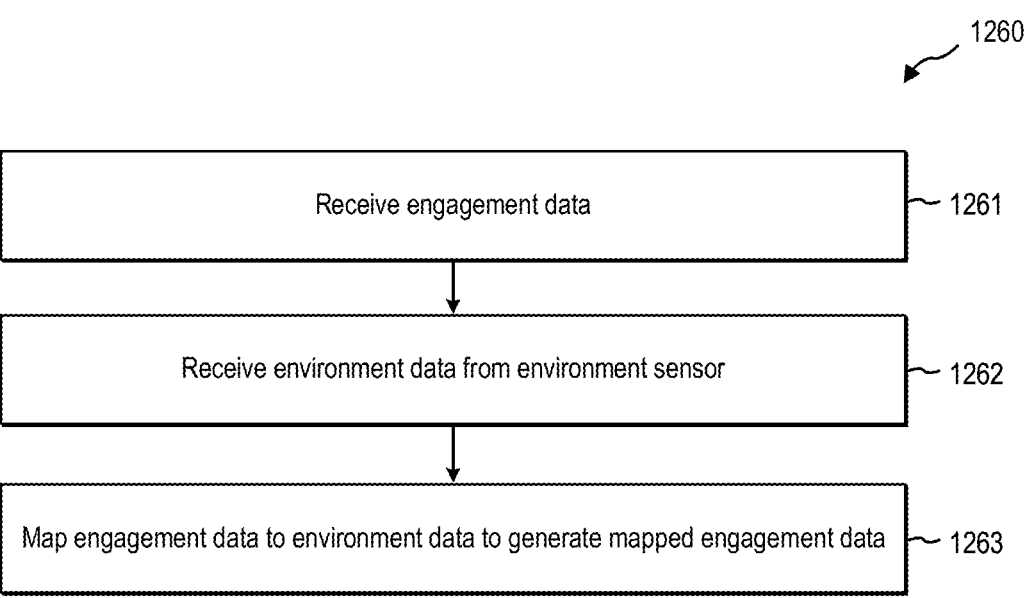
Figure 13:
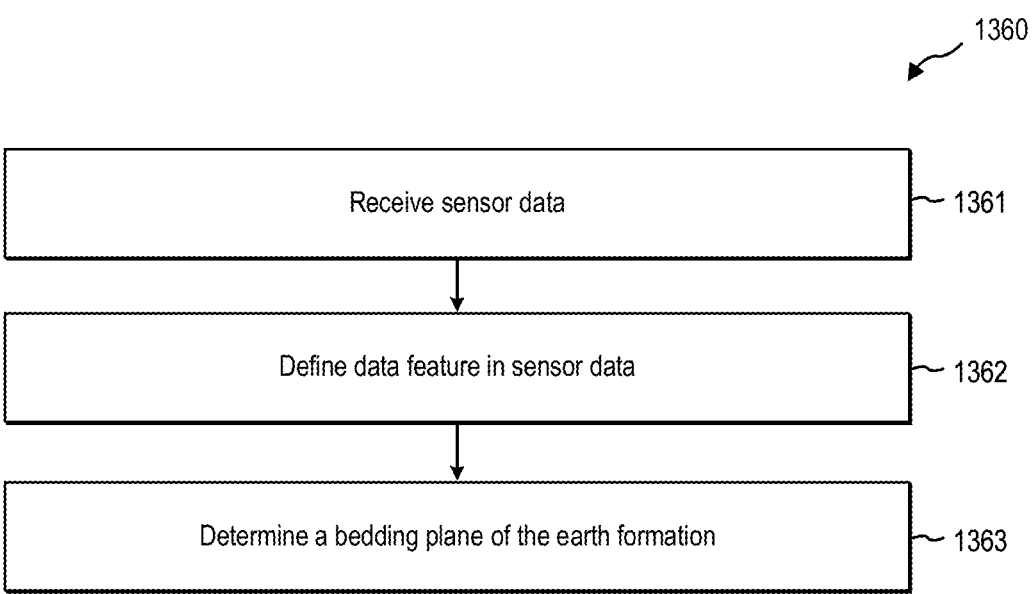
Figure 14:
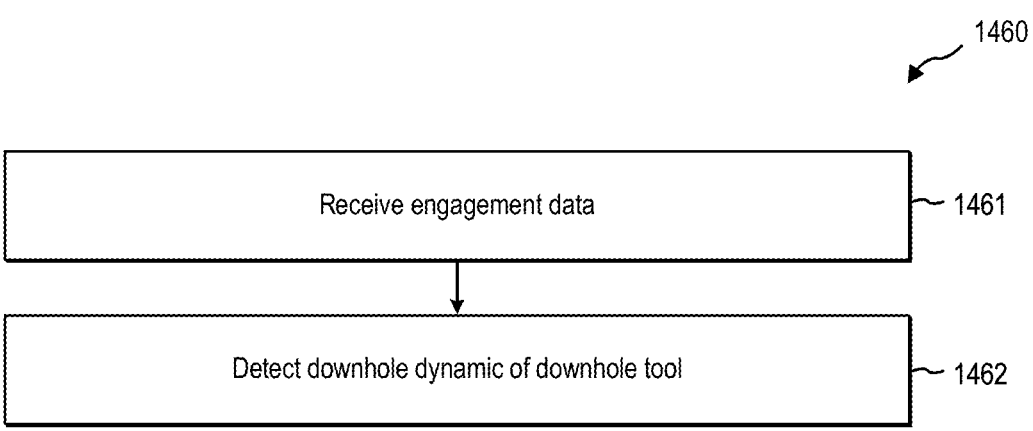
Figure 15:
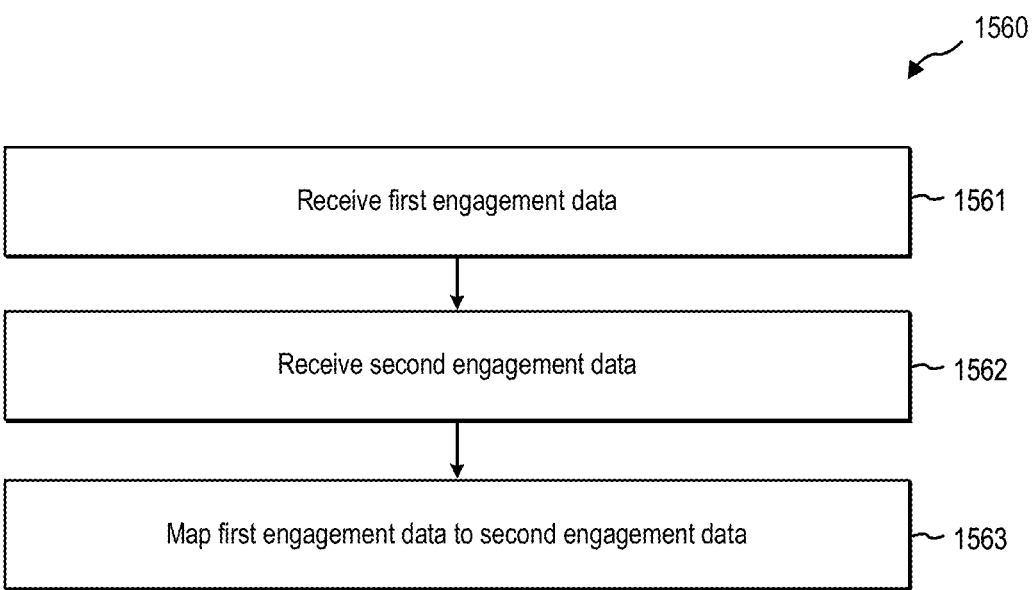

FIG. 11 illustrates an example flow of information between components of a downhole imaging system, according to at least one embodiment of the present disclosure;

FIG. 12 illustrates a flow diagram for a method or a series of acts for identifying a geothermal reservoir of an earth formation as discussed herein, according to at least one embodiment of the present disclosure; and FIG. 13 illustrates a flow diagram for a method or a series of acts for determining a geological feature of an earth formation as discussed herein, according to at least one embodiment of the present disclosure;

FIG. 14 illustrates a flow diagram for a method or a series of acts for determining downhole dynamics as discussed herein, according to at least one embodiment of the present disclosure;

FIG. 15 illustrates a flow diagram for a method or a series of acts for determining downhole dynamics as discussed herein, according to at least one embodiment of the present disclosure; and

4

Figure 16:
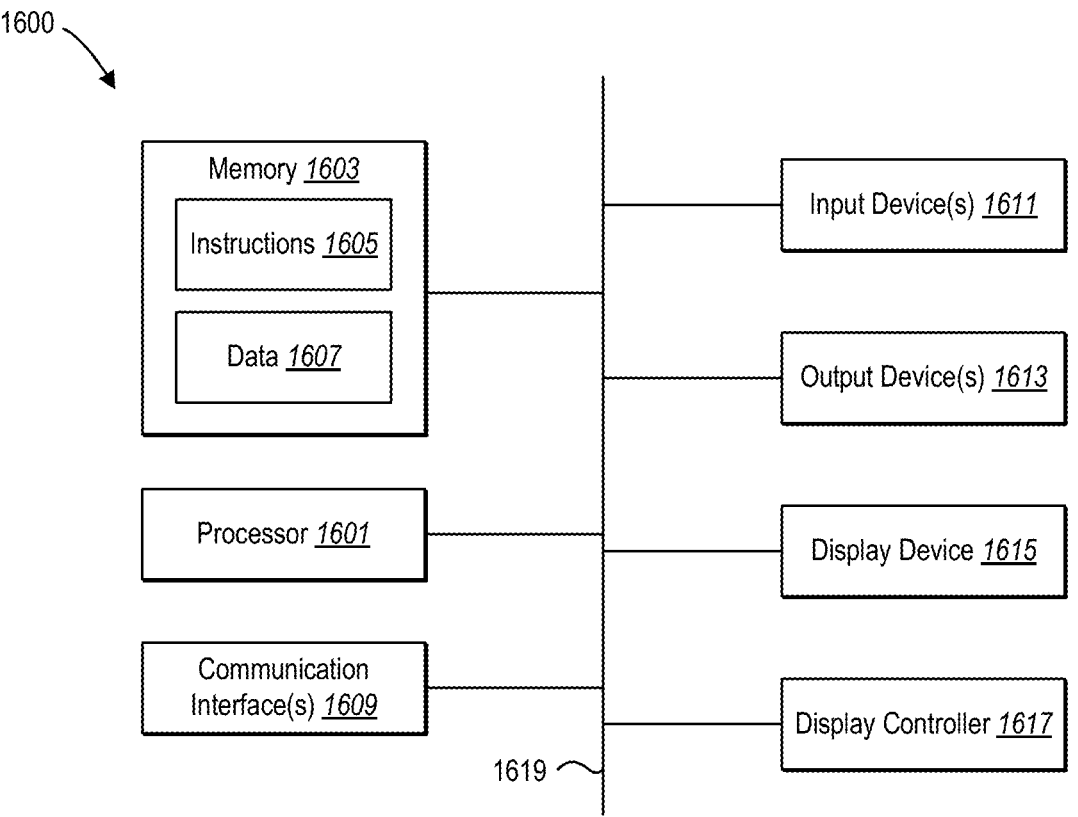

FIG. 16 illustrates certain components that may be included within a computer system.

DETAILED DESCRIPTION

This disclosure generally relates to devices, systems, and methods for mapping an earth formation or a downhole environment. For example, a drilling system may implement one or more tools for engaging a borehole. An instrumented engagement element may be implemented in conjunction with one or more downhole tools and may engage and/or degrade the borehole. The instrumented engagement element may include one or more sensors for taking engagement measurements (e.g., drilling, milling, reaming, stabilizing, steering, other measurements, or combinations thereof), such as force measurements, associated with the engagement of the engagement element with the borehole. The observed downhole measurements (and/or changes in the observed downhole measurements) facilitate determining and/or mapping one or more features of the borehole, in at least one embodiment described herein. The drilling system may take one or more additional downhole measurements. For example, the drilling system may take force measurements, rotation measurements, depth measurements, environment measurements, other downhole measurements (e.g., drilling, milling, reaming, stabilizing, steering, other measurements, or combinations thereof), or combinations thereof for performing one or more of the techniques described herein.

The downhole system may include a computing device which may implement a downhole imaging system. For example, the downhole imaging system may be a computer-implemented method, or one or more aspects of the downhole imaging system may be performed as a computer-implemented method. The downhole imaging system may receive one or more of the measurements discussed above as sensor data. The downhole imaging system may map (e.g., associate) the data. For example, the downhole imaging system may associate portions of the engagement measurements with portions of the other measurements (e.g., force measurements, rotation measurements, depth measurements, environment measurements, other downhole measurements, or combinations thereof) to orient the engagement measurements, for example, with respect to the borehole. The downhole imaging system may map any other data or portions of data. For example, the downhole imaging system may map the engagement data to environment data, or to a global reference frame.

The downhole imaging system may generate one or more images based on, for example, the oriented (e.g., mapped) engagement data. The images may visually present or illustrate the oriented engagement data in the form of a graph, plot, picture, other visual representation, or combinations thereof. The images may illustrate one or more geological features, such as a crack or fracture, of the earth formation. The images may facilitate determining the presence or location of one or more geological features such as a geothermal reservoir.

The downhole imaging system may identify and/or may facilitate identifying one or more geological features of the earth formation and/or one or more downhole dynamics associated with the downhole tool. For example, the downhole imaging system may generate feature data indicating one or more geological features and/or downhole dynamics based on the sensor data, based on the mapped data, based on the generated image, or based on any other data. The downhole imaging system may transmit data to one or more drilling devices. For example, the downhole imaging system may transmit the sensor data, mapped data, feature data, the generated images, or combinations thereof to one or more drilling device.

As will be discussed in further detail below, the present disclosure includes a number of practical applications having features described herein that provide benefits and/or solve problems associated with identifying and/or characterizing geological features of an earth formation and/or downhole dynamics. Some example benefits are discussed herein in connection with various features and functionalities provided by a downhole imaging system implemented on one or more computing devices. It will be appreciated that benefits explicitly discussed in connection with one or more embodiments described herein are provided by way of example and are not intended to be an exhaustive list of all possible benefits of the downhole imaging system and further are not intended to limit the scope of the claims.

For example, in order to effectively plan and execute drilling operations, it can be critical to identify and/or map geological features and/or structures of an earth formation or of a reservoir. The downhole imaging techniques discussed herein may detect and/or facilitate detecting geological features of the earth formation such as cracks, fractures, formation boundaries, formation angles, bedding planes etc. Identifying and/or understanding such geological features can be invaluable for determining, for example, where underground resources may be located, how to drill through and/or penetrate certain formations, well completion strategies, risk factors associated with certain formations, among other factors. Thus, implementing the downhole imaging techniques described herein to detect and/or map geological features of the earth formation may provide significant cost, time, and/or resource savings by providing a better understanding of the formations being drilled, as well as an increased confidence in the features presumed to be present in the earth formation.

In addition to generally detecting geological features, the downhole imaging techniques described herein can generate images of the borehole to facilitate determining and/or confirming geological features. For example, engagement measurements associated with geological features may be transformed into photograph-like images of the borehole which may facilitate determining the location, orientation, size, or general presence of geological features. Indeed, the downhole imaging techniques described herein may in essence provide a photograph resembling the borehole.

Further, one or more techniques described herein may be useful for detecting and/or determining one or more downhole dynamics. For example, during downhole operations (e.g., drilling) a downhole tool may exhibit a variety of behaviors such as stick slip and/or whirl. These behaviors may be associated with an inefficient operation of the downhole tool and/or potential damage to one or more drilling components. Determining the occurrence of these dynamics may facilitate making critical decisions regarding the operation of the drilling system in order to ensure that the downhole tool is operating properly. In another example, implementing the techniques described herein to determine downhole dynamics such as ROP, torque on bit, depth of cut, etc., may be advantageous for ensuring an efficient and effective operation of the downhole tool. In this way, the techniques described herein may facilitate a more complete understanding of the operation of the drilling system as a whole.

Additionally, some conventional borehole surveying and/or characterization methods require specialized tools implemented in the borehole, for example, by stopping or pausing drilling operations. In some cases, drilling tools must be removed from the borehole to perform conventional imaging techniques, resulting in costly downtime of the drilling system. The borehole images described herein may be generated based on data taken during drilling operations, and in some situations the images may also be generated during drilling operations or in real time. In this way, the earth formation may be mapped and/or characterized without the downtime expenses of some conventional methods, resulting in cost and resource savings. As such, a variety and/or any number of images may be generated of the borehole, for example, at any depth and/or for any duration (e.g., length) of the borehole. In contrast, the downtime associated with some conventional borehole characterization techniques may impose practical limits to how much or how long such techniques may be implemented. Indeed, the imaging techniques described herein may realistically be implemented to image any portion (or an entirety) of a borehole with little to no operational limits on duration, detail, etc.

Some conventional borehole surveying and/or characterization methods require specialized tools implemented in the borehole as part of the drilling tool assembly and/or as part of a bottom hole assembly ("BHA"), such as measurement-while-drilling (MWD) and/or logging-while-drilling (LWD) tools. MWD and LWD tools are often implemented above or uphole from one or more downhole (e.g., drilling) tools such as a bit or reamer. MWD and LWD tools may take measurements and/or facilitate generating images associated with the borehole. However, because these tools are located uphole of the drilling tools (e.g., up to 100 ft), any information gathered by these measurement tools is effectively delayed with respect to the drilling tools located further downhole. In other words, MWD and LWD tools do not realistically characterize downhole dynamics as the drilling tools interact with the formation and/or characterize the earth formation proximate a point of engagement of the drilling tools. Due to this, conventional tools can have practical limits on their usefulness for making real-time decisions regarding the operation of the drilling tools located further downhole. In contrast, the techniques described herein may be implemented to take measurements at a point of engagement of one or more drilling tools with the earth formation. In this way, real-time information relevant to an immediate proximity of the drilling tools may be used to inform decisions about the operation of the drilling tools, such as decisions related to steering of one or more drilling components, drilling speed, rate of penetration, weight on bit, stopping one or more drilling components, adjusting any other drilling parameter, and combinations thereof.

Further, while conventional MWD and LWD tools may take measurements and/or facilitate generating images of the borehole, such measurements and/or images are typically of limited resolution. The imaging techniques of the present disclosure may generate images of improved resolution over, for example, conventional borehole images. MWD and LWD imaging tools are also typically quite expensive to both manufacture and to implement downhole. Exposing expensive instrumentation to the harsh downhole environment presents the possibility that the instrumentation may become damaged or lost. In contrast, the imaging techniques described herein may be implemented through simple and inexpensive instrumentation in connection with engagement elements that may already be designed and/or configured to withstand the harsh environment downhole. The instrumentation of the present disclosure may also be implemented into existing downhole tools or as a retrofit of existing tools, further adding to the simplicity and cost savings.

As illustrated in the foregoing discussion and as will be discussed in further detail herein, the present disclosure utilizes a variety of terms to describe features and advantages of the methods and systems described herein. Some of these terms will be discussed in further detail below.

As used herein, a "data feature" may refer to any feature or distinguishable instance of data or a portion of data. For example, a data feature may correspond with one or more instances of data over, under, or within a threshold value, or instances of a threshold change in data. A data feature may correspond to one or more instance of data that occurs a threshold number of times. A data feature may correspond to one or more instances that deviate or occur outside a threshold level, expected range, or other defined limit of data. Indeed, a data feature may be any other element, aspect, pattern, variance, outlier, or correlation of data, and combinations thereof.

As used herein, "borehole feature" may refer to a physical feature present or detected in a borehole. For example, a borehole feature may be a crack or fracture detected in a portion of the borehole. A borehole feature may correspond to or may be identified based on a data feature, for example, oriented with respect to a local reference frame of the borehole. For example, a borehole feature may be an indication of a crack in the borehole at an angle of 95° within the borehole. In this way, a borehole feature may be a local indication of a physical feature present or detected in the borehole (e.g., as opposed to a global indication of a physical feature of the earth formation at large).

As used herein, "geological feature" may refer to a physical feature present or detected in the earth formation in which the borehole is located. For example, a geological feature may be a crack or fracture detected in relation to or associated with the greater earth formation. A geological feature may correspond to or may be identified based on data features and/or borehole features, for example, oriented with respect to a global reference frame of the earth formation at large. For example, a geological feature may be an indication of a crack in the earth formation that runs cast to west. In another example, a geological feature may be a geothermal reservoir in the earth formation detected in relation to a detected borehole feature (e.g., crack or fracture). In this way, a geological feature may be a global indication of a physical feature present and/or detected in the earth formation generally.

As used herein, "borehole image" may refer to an image that is associated with a borehole in an earth formation or associated with the removal of material from the earth formation to form a borehole. In some situations, a borehole image may correspond to a borehole of a finished or completed diameter such that the image substantially resembles or represents a view of, for example, an inner wall or circumferential surface of the finished borehole. In some situations, a borehole image may correspond to an intermediate or temporary diameter of a borehole that may be further expanded to a completed diameter. In this way, the borehole image may represent or may substantially resemble a borehole wall of a reduced diameter that may no longer exist within the borehole or may correspond to formation material that has been removed downhole such that it may no longer be visible, for example, upon physical inspection.

FIG. 1 shows one embodiment of a downhole system. The downhole system of FIG. 1 is a drilling system 100 for drilling an earth formation 101 (e.g., a downhole earth formation) to form a wellbore or borehole 102. In some embodiments, the downhole system is a drilling system, milling system, reaming system, stabilizing system, steering system, other downhole system, or combinations thereof. The drilling system 100 may include a drill rig 103 used to turn a drilling tool assembly 104 which extends downward into the borehole 102. The drilling tool assembly 104 may include a drill string 105, a BHA 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, rotational power is transmitted by one or more mud motors located in the borehole 102. In some embodiments, the drill string 105 further includes additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the borehole 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the borehole 102. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The drilling system 100 may include a sensor 111. For example, the sensor 111 may be located in a downhole tool of the drilling system 100, such as the bit 110, a reamer, a stabilizer, or any other downhole tool. The sensor 111 may be an engagement sensor. For example, the sensor 111 may take one or more engagement measurements corresponding with an engagement with the borehole. The sensor 111 may be or may be included in an instrumented engagement element implemented in the bit 110. The sensor 111 may be a force sensor for measuring a force associated with the instrumented engagement element engaging the borehole 102. The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the borehole 102. The bit 110 may also be a junk mill used to mill away tools, plugs, cement, other materials within the borehole 102, or combinations thereof. Swarf or other cuttings formed by use of a mill may be lifted to surface or may be allowed to fall downhole.

The drilling system 100 may include a computing device 112. The computing device may be in data communication with the sensor 111 for receiving one or more signals from the sensor 111. In some embodiments, the computing device 112 is located at the surface of the borehole 102. For example, the computing device 112 may be a drilling computer or any other user equipment at the surface of the borehole 102 (e.g., located at or associated with the drill rig 103). In some embodiments, the computing device 112 is located in the borehole 102. For example, the computing device may be associated with and/or located in a component of the drilling tool assembly such as at a downhole tool (e.g., the bit 110). The computing device 112 may be located in close proximity to the sensor 111 in the borehole 102 or may be located at another location within the borehole 102. In this way the sensor 111 may transmit one or more signals to the computing device 112, such as one or more measurements taken in the borehole 102.

The computing device 112 may include a downhole imaging system 120 for performing one or more of the downhole imaging techniques described herein. For example, the computing device may include a processor and memory. The memory may contain one or more instructions which, when executed, cause the processor to perform one or more functions of the downhole imaging system 120, as will be described herein in detail.

FIG. 2 is a bottom view of the downhole end of an embodiment of a bit 210. The bit 210 may include a bit body 213 from which a plurality of blades 214 may protrude. At least one of the blades 214 may have a plurality of cutting elements 215 connected thereto. In some embodiments, at least one of the cutting elements 215 is a planar cutting element, such as a shear cutting element. In other embodiments, at least one of the cutting elements 215 may be a non-planar cutting element, such as a conical cutting element (e.g., Stinger cutting elements) or a ridged cutting element.

In some embodiments, the bit 210 includes an instrumented engagement element 216. The instrumented engagement element 216 may include instrumentation (e.g., a sensor) for taking one or more downhole measurements with the bit 210. For example, the instrumented engagement element 216 may include one or more sensors for measuring force, pressure, temperature, etc.

In accordance with at least one embodiment of the present disclosure, the instrumented engagement element 216 includes a sensor engagement element and an engagement sensor. The instrumented engagement element 216 may engage (e.g., contact, press against, degrade) a borehole, and the sensor may take measurements, for example, corresponding to forces on the instrumented engagement element 216. For example, the instrumented engagement element 216 may contact or engage the borehole as the bit 210 rotates, and the instrumented engagement element 216 may experience changing dynamics (e.g., forces) as it passes over and/or past physical features of the borehole. These changes may be measured by the engagement sensor. The instrumented engagement element 216 may be in data communication with a computing device (such as the computing device 112 of FIG. 1) for communicating one or more signals corresponding to one or more measurements taken by the engagement sensor. In some embodiments, the engagement measurements facilitate creating or generating a graph, plot, image, or map of the engagement by the sensor engagement element and/or the bit 210 with the borehole. In some embodiments, the engagement measurements facilitate identifying one or more borehole features and/or geological features. In some embodiments, the engagement measurements are force measurements, and a graph, plot, image, map, etc. is generated based on the force measurements.

Although FIG. 2 describes the use of one instrumented engagement element 216 in conjunction with a bit 210, it should be understood, however, that a downhole tool (e.g., a bit) in accordance with any of the embodiments of the present disclosure may include two or more instrumented engagement elements 216. For example, a bit 210 may include 2, 3, 4, 5, or more instrumented engagement elements 216 for taking multiple measurements. In some embodiments, the instrumented engagement elements 216 are each oriented and/or configured the same. In some embodiments, one or more of the instrumented engagement elements 216 are oriented and/or configured differently than another of the instrumented engagement elements 216. For example, a first engagement element assembly may be oriented to take engagement measurements corresponding with axial force and a second engagement element assembly may be oriented to take engagement measurements corresponding with rotational force or torque. In some embodiments, multiple instrumented engagement elements 216 are configured with respect to axial force but are positioned at different radii and/or behind different lead cutting elements. In some embodiments, multiple instrumented engagement elements 216 are configured with respect to rotational force at the same radius in order to ensure a more accurate measurement. One or more of the multiple instrumented engagement elements 216 may be oriented and/or configured and/or combined in any other way, in order to take one or more measurements associated with the bit and/or the formation, as described herein.

The embodiments shown herein illustrate downhole tools (e.g., bits) having instrument assemblies with various components having specific configurations and/or orientations. It should be understood, however, that the instrument assembly of the present disclosure is not limited to implementation in only a bit of a drilling system. Rather, the techniques described herein may be employed in connection with any downhole tool. For example, one or more instrumented engagement elements 216 as described herein may be implemented in a reamer, a stabilizer, steering component, or any other downhole tool (e.g., downhole tools that contact and/or engage an inner wall of the borehole).

Additionally, it should be understood that the instrumented engagement elements 216 described herein in various embodiments are not limited to engagement elements that cut, or configurations where the borehole is being cut, lengthened, widened, etc. To this end, the instrumented engagement element 216 may be any type of engagement element for engaging or interfacing with the borehole. For example, one or more downhole tools may implement an instrumented engagement element 216 with an ultrahard (e.g., diamond) tip or coating that is not necessarily intended to or limited to cutting the formation. For example, a stabilizer may include one or more instrumented engagement elements 216 (such as a stabilizer pad) for engaging the borehole for the purpose of stabilizing or centering one or more components of the drilling tool assembly, as opposed to cutting. Such instrumented engagement elements 216 may be implemented in order to perform the techniques described herein. Other downhole tools may implement other engagement elements 216 for the purpose of engaging the borehole that may not necessarily be limited to cutting. In other words, the instrumented engagement element 216 described herein may be any engagement elements implemented in connection with any downhole tool.

Further, it should be understood that the instrumented engagement elements 216 of the present disclosure are not limited to only the configurations and/or orientations illustrated and described herein. For example, an instrumented engagement element 216 may be oriented at an angle from vertical, in a radial or outward direction, or any other orientation for engaging the borehole as described herein. In this way, any type of downhole tool may include an instrument assembly (including an engagement element) having any configuration for taking downhole measurements, and the instrument assembly may be configured, oriented, and adapted to function in accordance with the manner in which a given downhole tool engages the borehole.

FIG. 3 illustrates an example computing device 312 having a downhole imaging system 320 implemented thereon, according to at least one embodiment of the present disclosure. In some embodiments, the downhole imaging system 320 includes a sensor data manager 321, a mapping engine 322, a feature detection manager 323, an image generation engine 324, and a communication module 325. In some embodiments, the downhole imaging system 320 includes data storage 326. While one or more embodiments described herein describe features and functionalities performed by specific components 321-325 of the downhole imaging system 320, it will be appreciated that specific features described in connection with one component of the downhole imaging system 320 may, in some examples, be performed by one or more of the other components of the downhole imaging system 320.

By way of example, as will be discussed below, one or more features of the downhole imaging system 320 may be delegated to other components of the downhole imaging system 320. As another example, while mapping of sensor data may be performed by a mapping engine 322, in some instances, some or all of these features may be performed by the feature detection manager 323, the sensor data manager 321, or any other component of the downhole imaging system 320. Indeed, it will be appreciated that some or all of the specific components may be combined into other components and specific functions may be performed by one or across multiple of the components 321-325 of the downhole imaging system 320.

As just mentioned, the downhole imaging system 320 includes a sensor data manager 321. The sensor data manager 321 may receive downhole measurements 317 from one or more sensors 311. For example, the sensors 311 may include an engagement sensor and/or a rotation sensor which may communicate engagement measurements and/or rotation measurements to the sensor data manager 321. In another example, the sensors 311 may include an environment sensor which may communicate environment measurements to the sensor data manager 321. The downhole measurements 317 may be measurements that are taken, for example, in the borehole. The downhole measurements 317 may be measurements taken at the surface, or at any other location. In this way, the downhole measurements are not limited to measurements taken downhole, but rather may include any measurement relevant to downhole drilling or a drilling system, as described herein.

In some embodiments, the sensor data manager 321 receives the downhole measurements 317 and records or stores the downhole measurements 317 to the data storage 326 as sensor data 327. For example, the sensor data manager 321 may store, as sensor data 327, one or more raw signals associated with the downhole measurements 317. In another example, the sensor data manager 321 may perform one or more operations on the downhole measurements 317 (e.g., the raw signal) to one or more of alter, adjust, filter, compress, amplify, segment, and combine the downhole measurements 317. This may be prior to storing the downhole measurements 317 as sensor data 327 or may be in addition to storing the raw signals of the downhole measurements 317 as sensor data 327. In some embodiments, the sensor data manager 321 transmits or communicates the sensor data 327 to one or more components of the downhole imaging system 320, such as the mapping engine 322. In this way, the downhole imaging system 320 may receive and/or store one or more downhole measurements 317 from the sensors 311.

As mentioned above, the downhole imaging system 320 includes a mapping engine 322. In some embodiments, the mapping engine 322 receives data, such as sensor data 327, from the sensor data manager 321. The mapping engine 322 may also access the data storage 326 to receive data. The mapping engine 322 may map any of the data accessible to the downhole imaging system 320. For example, the mapping engine 322 may associate one or more specific instances of data with one or more other specific instances of data. In this way, the mapping engine 322 may generate mapped data 328. The mapping engine 322 may store the mapped data 328 to the data storage 326.

As mentioned above, the downhole imaging system 320 includes a feature detection manager 323. In some embodiments, the feature detection manager 323 detects and/or facilitates detecting data features, borehole features, geological features, downhole dynamics, other downhole features, and combinations thereof. For example, the feature detection manager 323 may analyze (e.g., perform one or more operations on) data it receives to determine data features and/or corresponding geological features of the earth formation. The feature detection manager 323 may detect features in any data and/or may incorporate any type of data in order to determine features, such as incorporating user input or incorporating image data. The feature detection manager 323 may generate and/or store an indication of the detected features as feature data 329. In this way, the downhole imaging system 320 may identify data features, borehole features, geological features, other downhole features, or combinations thereof.

As mentioned above, the downhole imaging system 320 includes an image generation engine 324. In some embodiments, the image generation engine 324 generates image data 330 which may include one or more plots, graphs, images, pictures, maps, any other visual representations, or combinations thereof based on any of the data discussed herein. For example, the image data 330 may present engagement measurements (e.g., force) with respect to rotation measurements. In another example, the image data 330 may present engagement measurements with respect to environment measurements. The image generation engine 324 may apply a color scale and/or color spectrum to data and in this way generate a photograph-like representation of the borehole. The color scales/color spectra as described herein may include grayscale scales/spectra. The image generation engine 324 may incorporate any data with the image such as pressure and/or temperature data and in this way may illustrate and/or represent a variety of downhole properties and/or dynamics of the borehole. In some embodiments, the image data 330 illustrates one or more borehole features and/or geological features. In some embodiments, the image data 330 illustrates one or more downhole dynamics. This may facilitate identifying the geological features and/or downhole dynamics, such as by the feature detection manager 323. In this way, the downhole imaging system 320 may generate image data 330.

As mentioned above, the downhole imaging system 320 includes a communication module 325. The communication module 325 may be configured to communicate with one or more drilling devices. The communication module 325 may communicate any of the data described herein. The communication module 325 may communicate with one or more drilling devices located at the surface and/or located in the borehole. In this way, the data collected and/or processed and/or generated by the downhole imaging system 320 may be transmitted to one or more devices associated with the drilling system.

In some embodiments, the downhole imaging system 320 includes data storage 326 with a variety of data and/or types of data stored thereon. For example, the data storage 326 may store one or more of the sensor data 327, the mapped data 328, the feature data 329, and the image data 330. In some embodiments, the data storage 326 stores the borehole data 331. The borehole data 331 may include and/or identify information about the borehole with respect to the earth formation, or with respect to a global reference frame of the earth formation. For example, the borehole data may include an azimuth, inclination, and a geographic location of the borehole with respect to the global reference frame of the earth formation. The borehole data 331 may include other information relevant to globally orienting the borehole. The borehole data 331 may include information related to other boreholes, such as geological features detected in other boreholes. The borehole data 331 may include any other data, such as data related to dynamics or parameters of the drilling system.

The techniques discussed herein (the various embodiments of the downhole imaging system described herein) may be discussed in some instances with respect to a flow of information, or with respect to one or more components of the downhole imaging system transmitting and/or passing data to one or more other components of the downhole imaging system. It should be understood, however, that in some situations, such a flow of information may be an illustrative tool useful for describing one or more aspects of the present invention, and not meant as a limit or a requirement that information be transmitted from one component to another. For example, in some situations, one or more components of a downhole imaging system may access a data storage to access and/or retrieve data rather than receiving the data directly from another component. In this way, one or more data elements may be transmitted between the various components of a downhole imaging system and/or the various components may access a data storage to access one or more data elements.

FIG. 4 illustrates an example flow of information between components of a downhole imaging system 420, according to at least one embodiment of the present disclosure. In some embodiments, the downhole imaging system 420 includes a sensor data manager 421, a mapping engine 422, a feature detection manager 423, an image generation engine 424, and a communication module 425.

As just mentioned, the downhole imaging system 420 includes a sensor data manager 421. The sensor data manager 421 may be in data communication with one or more sensors 411. The sensor data manager 421 may receive one or more downhole measurements 417 from the one or more sensors 411.

In some embodiments, the sensors 411 include an engagement sensor 432. The sensor data manager 421 may receive one or more signals from the engagement sensor 432 as engagement data 433. The engagement data 433 may include one or more engagement measurements taken by the engagement sensor 432, for example, corresponding with an engagement of a downhole tool (e.g., a bit) with a borehole. For example, a bit may include an instrumented engagement element, and the instrumented engagement element may include the engagement sensor 432. The instrumented engagement element may be configured to engage a borehole, for example, during drilling with the bit. The instrumented engagement element may experience dynamics (e.g., force, pressure, stress, displacement, etc.) due to its engagement with the borehole. These dynamics may change as the instrumented engagement element passes over and/or past physical features of the borehole (e.g., due to the rotation of the bit). The engagement sensor 432 may measure the corresponding dynamics and/or changes in dynamics and may transmit these measurements to the sensor data manager 421 as the engagement data 433. In some embodiments, the sensor data manager 421 stores the engagement data 433 to a data storage 426 of the downhole imaging system 420. For example, the sensor data manager 421 may store the engagement data 433 as part of sensor data 427. In this way, the downhole imaging system 420 may receive the engagement data 433, and the engagement data 433 may be accessible to one or more components of the downhole imaging system 420. In some embodiments, the engagement sensor 432 includes two or more sensors. For example, the engagement sensor 432 may include two or more sensors implemented on different instrumented engagement elements of the downhole tool. In another example, the engagement sensor 432 may include two or more sensors implemented on the same instrumented engagement element of the downhole tool. In this way, the engagement sensor 432 may take engagement data 433 based on a variety of engagements with the borehole or based on a variety of types of engagements with the borehole.

In some embodiments, the engagement data 433 is based on or associated with one or more forces experienced or exhibited by the instrumented engagement element. For example, the engagement sensor 432 may measure force, strain, stress, pressure, deformation, deflection, displacement, any other parameter associated with an engagement of the instrumented engagement element with the borehole, and combinations thereof. In some embodiments, the engagement sensor 432 measures force, either directly or through one or more other parameters calibrated for force (e.g., used to calculate force). The engagement sensor 432 may include a strain gauge, hall effect sensor, magnet, capacitive sensor, spring sensor, any other sensor for sensing dynamics related to an engagement with the borehole, and combinations thereof. In some embodiments, the engagement data 433 includes measurements associated with two or more of the parameters mentioned above. For example, the engagement data 433 may include measurements of normal (axial) force and shear force on the instrumented engagement element. In another example, the engagement data 433 may include measurements of stress and strain. In this way, the engagement sensor 432 may take multiple measurements and the engagement data 433 may include information relating to a variety of parameters associated with an engagement with the borehole.

In some embodiments, the sensors 411 include a rotation sensor 434. The sensor data manager 421 may receive one or more signals from the rotation sensor 434 as rotation data 435. The rotation data 435 may include one or more rotation measurements taken by the rotation sensor 434, for example, corresponding to a rotational orientation of the engagement data 433. In some embodiments, the rotation data 435 measures a rotational movement of one or more of the sensors 411, such as the engagement sensor 432. For example, a BHA component implementing the engagement sensor 432 may rotate within, or with respect to the borehole. The rotation of the BHA (e.g., including a bit, a reamer, a stabilizer, an RSS, other BHA components, or combinations thereof) may facilitate and/or may correspond with the engagement sensor 432 taking and/or measuring the engagement data 433. In some embodiments, the rotation data 435 is not measuring a rotational movement of the engagement sensor 432 but may instead measure a rotational orientation of the engagement data 433 with respect to the borehole. For example, the rotation data 435 may be a measurement of one or more (e.g., static) aspects and/or features of the borehole, and the rotation data 435 may be used to orient the engagement data 433 by associating or mapping one or more data features in the engagement data 433 with the borehole features of the rotation data 435. Aspects and features may be, for example, correlated to assemble the downhole data to reflect the actual orientation of the characteristics of the borehole. For example, as shown in FIG. 7-1, the engagement data 433 may be aligned based on corresponding aspects and/or features of the borehole.

In some embodiments, the sensor data manager 421 stores the rotation data to the data storage 426. For example, the sensor data manager 421 may store the rotation data 435 as part of the sensor data 427. In this way, the downhole imaging system 420 may receive the rotation data 435 and the rotation data 435 may be accessible to one or more components of the downhole imaging system 420, for example, to facilitate mapping or orienting the engagement data 433.

In some embodiments, the sensors 411 include a depth sensor 436. The sensor data manager 421 may receive one or more signals from the depth sensor 436 as depth data 437. The depth data 437 may include one or more depth measurement taken by the depth sensor 436, for example, corresponding to a depth of the downhole tool. The depth data 437 may correspond to a depth at which the engagement data 433 (or any other downhole measurements 417) were taken. For example, the depth data 437 may indicate a depth of the downhole tool at all instances of the engagement data 433. In another example, the depth data 437 may indicate a depth of the downhole tool at some of the instances of the engagement data 433, such as at instances of interest in the engagement data 433. In some embodiments, the depth data 437 is associated with the rotation data 435. For example, the rotation data 435 may identify and/or track each revolution of the downhole tool, and the depth data 437 may indicate a depth corresponding to each revolution. The depth data 437 may be related to or associated with any other data (e.g., sensor data 427). In this way, the depth data 437 may facilitate mapping a depth associated with one or more portions of the sensor data 427. In some embodiments, the sensor data manager 421 stores the depth data 437 as part of the sensor data 427. In this way, the downhole imaging system 420 may receive the depth data 437 and the depth data 437 may be accessible to one or more components of the downhole imaging system 420.

In some embodiments, the sensors 411 include an environment sensor 438. The sensor data manager 421 may receive one or more signals from the environment sensor 438 as environment data 439. The environment data 439 may include one or more measurements corresponding to the downhole environment, or the environment in or of the borehole. For example, the environment sensor 438 may measure pressure, temperature, fluid flow, any other parameter of the borehole environment, and combinations thereof. The environment data may be adjusted and/or corrected, for example, to account for drift at the environment sensor 438 (e.g., due to non-uniform temperature, pressure, or any other parameter on the environment sensor 438).

In some embodiments, the environment data 439 is associated with the environment of the borehole at a specific location or at a specific depth in the borehole. For example, the environment data 439 may be associated with a depth of the engagement data 433. In some embodiments the environment data 439 includes information about the environment of the borehole at all locations and/or depths of the borehole. In some embodiments, the environment data is taken while operating one or more downhole tools, such as while drilling. For example, the environment sensor 438 may be implemented on a downhole tool and may measure the environment data 439 while the downhole tool is being operated. In some embodiments, the environment sensor 438 is included on the same downhole tool as the engagement sensor 432, such as a bit. In some embodiments, the environment sensor 438 is implemented on a different downhole tool from the engagement sensor 432. In some embodiments the environment data is taken after stopping or pausing drilling operations. The environment data may facilitate characterizing downhole dynamics, generating one or more images, detecting geological features of the earth formation, and combinations thereof, as will be discussed herein in detail. In some embodiments, the sensor data manager 421 stores the environment data 439 as part of the sensor data 427. In this way, the downhole imaging system 420 may receive the environment data 439 and the environment data 439 may be accessible to one or more components of the downhole imaging system 420.

In some embodiments, the downhole imaging system 420 (more specifically the sensor data manager 421) is in data communication with one or more sensors 411 in addition to those shown in FIG. 4. For example, the sensor data manager 421 may receive downhole measurements 417 from gyroscopes, accelerometers, 1 and/or 2 and/or 3 axis force sensors, light sensors, sound sensors, sensors for measuring electrical properties, lithology and mineralogy sensors, any other sensor for taking measurements relevant to downhole operations and/or the borehole, and combinations thereof. In some embodiments, the sensor data manager 421 is not receiving downhole measurements 417 from one or more of the sensors 411 shown in FIG. 4. In this way, the sensor data manager 421 may receive downhole measurements 417 from any combination of sensors 411 (including those shown and any other sensor) to facilitate one or more of the techniques described herein.

As mentioned above, the downhole imaging system 420 includes data storage 426. The data storage 426 may include a variety of data and/or types of data stored thereon, such as the sensor data 427. In some embodiments, the data storage 426 includes borehole data 431. The borehole data 431 may include and/or identify information about the borehole and/or the earth formation. For example, the borehole data 431 may include and/or identify an orientation, length, angle, azimuth, inclination, size, other characteristic of the borehole, or combinations thereof. In some embodiments, the borehole data 431 identifies one or more aspects of the borehole with respect to the earth formation. For example, the borehole data 431 may identify geographic information associated with the borehole such as GPS coordinates, latitude and longitude, elevation, geographic location and/or orientation relative to other boreholes or geographic features, cardinal orientation of the borehole, any other borehole information, or combinations thereof. In another example, the borehole data 431 may include information about other (e.g., nearby) boreholes, such as geological features detected in other boreholes. In some embodiments, the borehole data 431 facilitates associating and/or orienting one or more portions of the sensor data 427 with respect to the earth formation or with respect to a geographic and/or global reference frame. For example, one or more techniques describe herein may associate and/or orient data with respect to the borehole. The borehole data 431 (e.g., the geographic and/or global nature of the borehole data 431) may facilitate associating that data with respect to the earth formation or orienting the data with respect to a global frame. This may, for example, facilitate associating one or more data features and/or borehole features to geological features of the earth formation in which the borehole is located.

In some embodiments, at least a portion of the borehole data 431 is input into the downhole imaging system 420. For example, geographic information associated with the borehole may be provided to the downhole imaging system 420 (e.g., by a user). In some embodiments, one or more portions of the borehole data 431 is identified by the downhole imaging system 420. For example, the downhole imaging system 420 may be in data communication with (e.g., via the sensor data manager 421) one or more sensors that may detect and/or measure one or more portions of the borehole data 431. In another example, the downhole imaging system 420 may be in data communication with (e.g., via communication module 425) one or more computing devices (e.g., drilling devices), and may receive one or more portions of the borehole data 431 from these computing devices. In this way the borehole data 431 may include any data relevant to a global reference frame of the earth formation.

As mentioned above, the downhole imaging system 420 includes a mapping engine 422. The mapping engine 422 may receive one or more portions of the sensor data 427 from the sensor data manager 421. For example, the sensor data manager 421 may transmit the engagement data 433 and/or the rotation data 435 to the mapping engine 422. The mapping engine 422 may receive any other data accessible to the downhole imaging system 420. The mapping engine 422 may map one or more portions of data to one or more other portions of data to generate mapped data 428. For example, the mapping engine 422 may associate specific instances in the engagement data 433 to a specific angle or rotational position within the borehole based on the rotation data 435 (e.g., to generate oriented engagement data as described herein). In another example, the mapping engine 422 may map oriented engagement data to a geographic or global reference frame based on the borehole data 431. In another example, the mapping engine 422 may associate specific instances in the engagement data 433 to a specific depth in the borehole based on the depth data 437. In another example, the mapping engine 422 may associate specific instances in the engagement data 433 to specific instances in the environment data (e.g., a temperature and/or pressure).

In some embodiments, the mapping engine 422 maps data by generating or quantifying one or more relationships between data sets. For example, the mapping engine 422 may fit a line of best fit to one or more sets of data, fit one or more sets of data to line or curve, compensate and/or adjust one or more sets of data to correlate to other data sets, any other technique to relate one or more sets of data to other data, and combinations thereof. The mapping engine 422 may perform one or more operations or transformations on one or more sets of data, for example, to calculate or associate one or more parameters of a set of data to one or more further parameters. For example, as will be discussed herein in detail, the mapping engine 422 may map normal force data to shear force data. The mapping engine 422 may correlate multiple sets or ranges of this mapped force data, for example, to fit to a single line or curve illustrating shear force with respect to normal force.

The mapping engine 422 may map any combination of the sensor data 427 (or any other data accessible to the downhole imaging system 420) as described herein. In this way, the mapping engine may generate the mapped data 428 which may facilitate one or more of the imaging and/or feature detection techniques described herein.

In some embodiments, the mapping engine 422 transmits and/or passes data to one or more components of the downhole imaging system 420. For example, the mapping engine 422 may transmit data to a feature detection manager 423. In another example, the mapping engine 422 may transmit data to an image generation engine 424. In another example, the mapping engine 422 may transmit data to a communication module 425. In some embodiments, the mapping engine transmits the mapped data 428. In some embodiments, the mapping engine transmits the sensor data 427, for example, without mapping one or more portions and/or combinations of the sensor data 427. The mapping engine 422 may transmit any other data and/or combination of data.

FIG. 5 illustrates an example flow of information between components of a downhole imaging system 520, according to at least one embodiment of the present disclosure. The downhole imaging system 520 includes a sensor data manager 521 and a mapping engine 522. The sensor data manager 521 may be in data communication with, and may receive downhole measurements from, one or more sensors. The sensor data manager 521 may transmit sensor data to the mapping engine 522.

In accordance with at least one embodiment of the present disclosure, the sensor data manager 521 transmits engagement data 533 to the mapping engine 522. For example, the engagement data 533 may be measured or taken by an engagement sensor. The engagement data 533 may include measurements associated with an engagement with the borehole, such as an engagement of an instrumented engagement element with the borehole. In some embodiments, the engagement data includes force data.

In some embodiments, the sensor data manager 521 transmits environment data 539 to the mapping engine 522. For example, the environment data 539 may be measured or taken by an environment sensor. The environment data 539 may include measurements corresponding to a downhole environment. The environment data 539 may correspond to the downhole environment at a location of the borehole associated with the engagement data 533, or any other data.

In some embodiments, the mapping engine 522 maps the engagement data 533 to the environment data 539 and generates mapped engagement data 528. For example, the mapping engine 522 may associate one or more specific instances in the engagement data 533 to one or more instances in the environment data 539. In another example, the mapping engine 522 may associate one or more instance in the engagement data 533 (e.g., instances of force) to one or more instances of temperature or pressure or both in the environment data 539. In this way, the mapped engagement data 528 may correspond to one or more temperatures and/or pressures sensed in the borehole (e.g., at a depth of the borehole corresponding to the engagement data 533). This may facilitate determining and/or characterizing one or more geological features (e.g., a geothermal reservoir) of the earth formation, for example, by the feature detection manager.

In this way, the mapping engine 522 may generate the mapped engagement data 528 by mapping the engagement data 533 to the environment data 539, in at least one embodiment. In some embodiments, the mapping engine 522 transmits the mapped engagement data 528 to one or more components of the downhole imaging system 520. In some embodiments, the mapping engine stores the mapped engagement data 528 to a data storage of the downhole imaging system 520 (e.g., as mapped data 328 of FIG. 3).

FIG. 6 illustrates an example flow of information between components of a downhole imaging system 620, according to at least one embodiment of the present disclosure. The downhole imaging system 620 includes a mapping engine 622 and an image generation engine 624. The mapping engine 622 may map together various combinations of data accessible to the downhole imaging system 620 as described herein. The mapping engine 622 may transmit data (e.g., mapped data) to the image generation engine 624.

In accordance with at least one embodiment of the present disclosure, the mapping engine 622 transmits mapped data 628. The mapped data 628 may be engagement data mapped to rotation data. The mapped data 628 may be engagement data mapped to environment data. The mapped data 628 may be any mapped data in accordance with that discussed herein. In some embodiments, the mapping engine 622 transmits the mapped data 628 to the image generation engine 624.

In some embodiments, the image generation engine 624 generates image data 630. The image data 630 may include one or more of a plot, graph, image, picture, map, or any other visual representation. The image generation engine 624 may generate the image data 630 based on data received from the mapping engine 622. For example, the image data 630 may be generated based on the mapped data 628. The image data 630 may illustrate a visual representation of the mapped data 628. For example, the image data 630 may illustrate the engagement data with respect to a rotational position or local angle of the engagement data within the borehole. In another example, the image data 630 may illustrate environment data (such as temperature and/or pressure) with respect to the engagement data. The image data 630 may substantially resemble a picture or photograph of the borehole, or more specifically, a portion of the borehole engaged by or removed by an instrumented engagement element of a downhole tool. For example, discrete intervals, instances, or groupings of the mapped data 628 may be represented by individual pixels which, when compiled together, present a photographic-like representation of the borehole.

The image data 630 may include and/or may illustrate and/or may visually distinguish one or more data features of the mapped data 628. For example, the data features may be represented in the image data 630 by different colors and/or different shades of color. In some embodiments, the data features correspond with one or more revolutions of the downhole tool (e.g., successive revolutions). The data features may correspond to one or more borehole features. For example, the data features may be identifiable in the image data 630 as one or more cracks, fractures, veins, etc.

In some embodiments the borehole features correspond to and/or may facilitate identifying one or more geological features of an earth formation in which the borehole is located. For example, the mapping engine may map global geographic data (e.g., borehole data 431 of FIG. 4) to the mapped data 628 in order to orient one or more data features and/or borehole features with respect to a global reference frame (e.g., of the earth formation). For example, the mapping engine may map a local angle and/or rotational position in the borehole with a global direction and/or angle, such as cardinal direction and/or an azimuth (angle measured clockwise from north). In some embodiments, the image data 630 includes and/or indicates (e.g., illustrates) the global reference frame. In this way, the image data 630 may illustrate and/or may facilitate determining one or more geological features of the earth formation based on the mapped data 628.

In some embodiments, the image generation engine 624 generates an image based on environment data. For example, the image data 630 may present or illustrate an indication of a temperature and/or a pressure of the borehole. The image data 630 may present or illustrate the environment data with respect to a depth within the borehole. In some embodiments, the image data 630 presents or illustrate the environment data with respect to the engagement data. For example, the environment data may be presented with respect to or corresponding with one or more identifiable features in the engagement data.

The image generation engine 624 is not limited to generating image data 630 based on the mapped data 628 but may generate image data 630 based on any data. For example, the image data 630 (and the techniques described related to the image data 630) may illustrate any combination of the sensor data described herein (whether mapped or not mapped). For example, the image data 630 may illustrate engagement data with respect to depth data. The image data 630 may illustrate any of combination of the sensor data with respect to the borehole data described herein. In this way, the image generation engine 624 may generate image data 630 including any number of images illustrating any number and/or combinations of data accessible to the downhole imaging system 620.

The image data 630 may illustrate or may provide a visual representation of one or more data features. For example, data features may be illustrated in the image data 630 corresponding to geological features. These data features may be illustrations of a given magnitude or change in magnitude of the underlying data, or may be visual representations of, for example, cracks or fractures in the earth formation. In another example, data features may be illustrated in the image data 630 corresponding to downhole dynamics. These data features may be visually distinguishable representations that indicate, for example, stick slip and/or whirl of a downhole tool, as will be discussed herein. In this way, the image data may provide visual representations of data features of interest. This may facilitate detecting and/or determining geological features and/or downhole dynamics, for example, by the feature detection manager, as will be discussed herein.

FIGS. 7-1 through 7-3 are example image data generated by an image generation engine of a downhole imaging system, according to at least one embodiment of the present disclosure. The image data may be generated based on any data and/or combinations of data received by the image generation engine, or accessible to the downhole imaging system described herein.

In some embodiments, the image generation engine generates an image based on engagement data. As shown in FIG. 7-1, the image generation engine may generate image data 730-1. The underlying data of the image data 730-1 may be mapped engagement data. For example, the engagement data may be mapped to rotation data, or may be locally oriented with respect to a borehole. The engagement data may be mapped to borehole data or may be globally oriented with respect to the earth formation. The image data 730-1 may include, at least in part, an illustration of the engagement data. For example, the image generation engine may apply a color scale 743 to a magnitude of the engagement data. The color scale 743 may represent a magnitude of the engagement data based on a color or a shade of a color. The color scale 743 may have a minimum 743-1 and a maximum 743-2 with colors and/or shades of colors at opposite ends of a spectrum. For example, the minimum 743-1 may be represented by a dark color, dark shade of color, high dot density, other visual magnitude indication, or combinations thereof and the maximum 743-2 may be represented by a light color, light shade of color, low dot density, other visual magnitude indication, or combinations thereof (or vice versa). The engagement data may be segmented into discrete intervals and may be assigned color or shade of color from the color scale 743 based on a magnitude associated with the discrete interval. For example, the discrete intervals may be individual measurements (e.g., based on sampling frequency or angle), or may be a combination of two or more individual measurements (e.g., an average). In this way discrete intervals with smaller magnitude may be represented by darker colors, and discrete intervals with larger magnitude may be represented by lighter colors (or vice versa). In this way, the engagement data may be segmented and transposed with the color scale 743 into a plurality of pixels 744 of the image data 730-1.

In some embodiments, the pixels 744 are positioned and/or oriented adjacent one another based on a rotational position and/or borehole angle 741-1 associated with the pixels 744. For example, each line of resolution of the image data 730-1 may be made of up sequential pixels corresponding to sequential engagement measurements from the same revolution of a downhole tool. In this way, the image data 730-1 may span from a borehole angle 741-1 of 0° on a first side 745 of the image to a borehole angle 741-1 of 360° on a second (opposite) side 746 of the image. The borehole angles 741-1 from 0° to 360° may represent a local reference frame of a borehole. The borehole angle 741-1 may be correlated with (e.g., mapped) to global angles (e.g., azimuth) of the earth formation. Accordingly, adjacent (horizontal) lines of resolution in the image data 730-1 may represent sequential revolutions of the downhole tool within the borehole. For example, as shown in FIG. 7-1, the revolutions of the downhole tool are illustrated as descending sequentially in the image data 730-1. In this way, the engagement data may be transposed into a photograph-like representation substantially resembling the borehole (or a portion of the borehole engaged with by an instrumented engagement element).

The image data 730-1 may represent or illustrate one or more features, such as data features, borehole features, and/or geological features. For example, some features may correspond with a higher or lower engagement measurement by the engagement sensor. These differences in magnitude (or changes in magnitude) may be illustrated in the image data 730-1. More specifically, the image data 730-1 may illustrate one or more fractures of cracks 747 (e.g., voids) as areas of lower magnitude. The image data 730-1 may illustrate a substrate 748 (e.g., formation material) as an area of higher magnitude. In some embodiments, the features illustrated in the image data 730-1 may facilitate identifying one or more borehole features and/or geological features, as described herein.

In some embodiments, the image data 730-1 illustrates data features corresponding to downhole dynamics. For example, the image data 730-1 may provide a visual representation of a whirl feature 749-1. The whirl feature 749-1 may correspond to whirl of a downhole tool (e.g., bit whirl). For example, in some situations, a downhole tool (such as a bit) may rotate unevenly or unbalanced and may begin to whirl or wobble with respect to its axis of rotation. This whirl may be exhibited by the downhole tool in a forward or backward direction. The whirl feature 749-1 may illustrate the whirl as one or more distinguishable transverse lines in the image data 730-1. The transverse lines may appear overlayed or superimposed over the picture-like image illustrating the borehole. In some embodiments, the direction of the transverse lines corresponds to the direction of the whirl (e.g., forward or backward). In this way, the image data 730-1 may illustrate or indicate bit whirl of the downhole tool.

In some embodiments, the image data 730-1 provides a visual representation of a stick slip feature 749-2. The stick slip feature 749-2 may correspond to a stick slip of a downhole tool. For example, in some situations, a downhole tool (such as a bit) may hang up, get stuck (e.g., momentarily), or otherwise rotate inconsistently. This may be based on an engagement of the downhole tool with the borehole, such as certain level of weight on bit, or a wear level of one or more engagement elements of the downhole tool. In this way, a downhole tool exhibiting or experiencing stick slip may rotate with an inconsistent rotational speed and/or may exhibit moments of higher rotational speed and/or moments of lower rotational speed. This effect may be illustrated in the image data 730-1. For example, the underlying data of the image data 730-1 may be illustrated with one or more instances rotationally out of phase from an expected or predicted location of the instances. In some embodiments, the illustration appears disjointed, fragmented, unconnected, segmented, pixelated, or otherwise inconsistent, for example, as compared to illustrations of data in similar or adjacent locations. The stick slip feature 749-2 may illustrate or indicate stick slip in any other way in accordance with the techniques disclosed herein. In this way, the image data 730-1 may illustrate or indicate stick slip of the downhole tool.

In some embodiments, the image generation engine incorporates and/or illustrates other data and/or combinations of data in addition to (or in place of) the engagement data. For example, the image data 730-1 may illustrate or may indicate a depth of the downhole tool, or a depth associated with the engagement data. The depth may be illustrated or indicated, for example, in place of (or in addition to) the quantity of revolutions in the image data 730-1. In this way, the image data 730-1 may indicate a depth (e.g., a depth below the surface) where one or more borehole features are located.

In some embodiments, the image generation engine generates image data based on environment data (e.g., pressure, temperature, etc.). For example, as shown in FIG. 7-2, the image generation engine may generate image data 730-2. The image data 730-2 may illustrate or may indicate a temperature and/or a pressure associated with the engagement data or with the downhole tool. The temperature and/or pressure may be adjusted and/or corrected, for example, to account for drift at the component measuring temperature and/or pressure (e.g., due to non-uniform heating and/or pressure on the component) The engagement data may be illustrated with respect to a depth within the borehole. For example, the image data 730-2 may illustrate a temperature and/or pressure associated with the engagement data with respect to depth. In some embodiments, the image data 730-2 illustrates at least a portion of the image data 730-1 of FIG. 7-1 and incorporates illustrations of the environment data (e.g., pressure and/or temperature). In this way, data features in the engagement data may be presented with respect to the environment data. This may facilitate identifying and/or detecting (e.g., with the feature detection manager) one or more borehole features and/or geological features, such as a geothermal reservoir, as will be described herein.

In some embodiments, the image generation engine generates image data such as a plot or a graph. For example, as shown in FIG. 7-3, the image generation engine may generate image data 730-3. The image data 730-3 may be a plot or a graph of, for example, the engagement data, or any other data (or mapped data) accessible to the downhole imaging system. For example, the image data 730-3 may illustrate or may present an engagement response such as force, stress, strain, or in some cases a unit-less (e.g., unit agnostic) engagement response associated with, for example, a voltage or signal sensed by the engagement sensor. In this way, the engagement with the borehole (e.g., by the sensor and/or an instrumented engagement element) may be illustrated including one or more instances of a specific level and/or changes in levels of measurements corresponding with the engagement. In some embodiments, the image data 730-3 illustrates one or more data features. The data features may correspond with one or more threshold levels, threshold changes, repeating instances and combinations thereof in the underlying data (e.g., engagement data) of the image data 730-3. The data features may correspond with and/or may facilitate determining one or more borehole features, geological features, downhole dynamics, and combinations thereof.

The various image data described herein may facilitate characterizing one or more aspects of the earth formation in which the borehole is located and/or downhole dynamics of the drilling system. For example, certain geological features may be of interest for determining where underground resources are likely to be located, such as hydrocarbons or geothermal energy. Certain geological features may be of interest in determining well completion strategies. Certain downhole dynamics may indicate damage to one or more drilling components and/or inefficiencies of the drilling operations. In this way, the image data generated by the image generation engine may be advantageous for the effective and efficient operation of a drilling system, as described herein, in at least one embodiment.

FIG. 8 illustrates an example flow of information between components of a downhole imaging system 820, according to at least one embodiment of the present disclosure. In some embodiments, the downhole imaging system 820 includes a mapping engine 822 and a feature detection manager 823. As described herein, the mapping engine 822 may map together various combinations of data accessible to the downhole imaging system 820. The mapping engine 822 may transmit data 850 to the feature detection manager 823.

The feature detection manager 823 may receive and/or access any data accessible to the downhole imaging system 820. For example, the data 850 may be sensor data, mapped data (e.g., mapped engagement data), image data, borehole data, any other type or form of data, and combinations thereof. The feature detection manager 823 may receive the data 850 from the mapping engine 822 or may access a data storage of the downhole imaging system 820 to receive data.

In some embodiments, the feature detection manager 823 receives engagement data. In some embodiments, the feature detection manager 823 receives engagement data mapped to rotation data and/or mapped to depth data. In some embodiments, the feature detection manager receives engagement data mapped to environment data (e.g., pressure data and/or temperature data). In this way, the feature detection manager 823 may receive data 850 to facilitate one or more feature detection techniques described herein.

In some embodiments, the feature detection manager 823 detects data features in the data 850 or based on the data 850. For example, the feature detection manager may perform one or more operations on the data 850 to analyze the data 850 and detect data features. As described herein, the data features may be one or more instances of interest in the data (e.g., instances, changes, repetitions, etc.). In some embodiments, the data features are instances of interest in the data due to a periodic nature of the instances. For example, one or more data features may occur periodically with respect to a rotational nature of the data, or with respect to a rotation of a downhole tool. The data feature may occur in substantially the same and/or similar and/or adjacent locations with respect to each period or rotation. In this way, multiple and/or successive revolutions of the data (e.g., of the downhole tool) may together form a data feature, or a data feature may be of interest due to the repetitive and/or periodic nature of the data feature. In this way, frequently-occurring and/or periodic data features may correspond to and/or indicate one or more borehole features and/or geological features and/or downhole dynamics.

The feature detection manager 823 may detect data features in any of the data 850 that it receives. For example, the feature detection manager 823 may detect features in the sensor data, such as the engagement data as described herein. In another example, the feature detection manager 823 may detect data features in mapped data, such as engagement data mapped to rotation data and/or environment data. In another example, the feature detection manager may detect data features in image data, for example, generated by an image generation engine of the downhole imaging system 820.

In some embodiments, the feature detection manager 823 provides an indication of the detected data features. For example, the feature detection manager 823 may generate feature data 829. The feature data 829 may include one or more flags, tags, labels, or alerts indicating the detected data features, or combinations thereof. In some embodiments, the feature data 829 indicates the detected data features, for example, on or with respect to the data received and/or input to the feature detection manager 823. In some embodiments, the feature data 829 indicates the detected data features separate from the input data. The feature detection manager 823 may store the feature data 829 to a data storage of the downhole imaging system 820.

In some embodiments, the feature detection manager 823 facilitates detecting one or more data features. For example, the feature detection manager 823 may incorporate one or more inputs from a user in order to identify, detect, validate, or authenticate data features, or combinations thereof. The feature detection manager 823 may present data and/or may facilitate presenting data to a user (e.g., through a printout, readout, graphical user interface, or combinations thereof) in order to receive user input associated with detecting data features. In this way, user interaction with the downhole imaging system 820 may be incorporated into the detecting of data features by or with the feature detection manager 823.

In some embodiments, the feature data 829 indicates and/or facilitates detecting one or more borehole features. For example, detected data features may correspond to one or more physical features (e.g., cracks) present and/or detected in the borehole. The detected data features may be oriented locally with respect to the borehole (e.g., based on oriented engagement data) and in this way correspond to borehole features. Thus, the feature data 829 may indicate, for example, that a crack is present (or detected) in the borehole at a given angle (e.g., 95°) of the borehole.

In some embodiments, the feature data 829 indicates and/or facilitates detecting one or more geological features. For example, detected data features may correspond to one or more physical features (e.g., cracks) with respect to the greater earth formation in which the borehole is located. The detected data features may be oriented globally with respect to the earth formation (e.g., based on mapping engagement data to a global reference frame) and in this way may correspond to geological features. Thus, the feature data 829 may indicate, for example, that the earth formation has a crack that is oriented in a given direction (e.g., east to west), in at least one embodiment.

In some embodiments, the feature data 829 indicates and/or facilitates detecting one or more downhole dynamics. For example, detected data features may correspond to one or more dynamics, properties, behaviors and combinations thereof of a downhole tool, such as a bit. In some embodiments, the feature data 829 indicates and/or facilitates detecting whirl of a downhole tool. In some embodiments, the feature data 829 indicates and/or facilitates detecting stick slip of a downhole tool.

In some embodiments, the feature detection manager 823 includes and/or implements one or more machine learning models to generate the feature data 829 and/or to detect one or more features. For example, the machine learning model may receive one or more inputs such as sensor data, mapped data, image data, borehole data, any other data of the downhole imaging system 820, or combinations thereof and may generate one or more outputs such as data features, borehole features, and geological features, downhole dynamics and combinations thereof. In an example, the machine learning model may be trained to detect one or more geological features and/or downhole dynamics of the earth formation based on receiving mapped data as described herein. The machine learning model may implement one or more of a classification model, regression model, decision tree model, clustering model, association model, any other model, and combinations thereof.

The machine learning model may be trained with training data. For example, sensor data, mapped data, image data, etc. corresponding with a known borehole or portion of a borehole may be provided as training characteristics, and an indication of one or more geological features and/or downhole dynamics (or lack thereof) may be provided as a ground truth. The machine learning model may implement one or more machine learning network layers (e.g., neural network layers). For example, the machine learning model may include input layers, hidden layers, output layers, and combinations thereof. The input layers may encode input data features corresponding to the input data into a numerical representation. The hidden layers may map and/or encode the input data to feature vectors. The output layers may process the feature vectors to decode geological feature information from the input data to determine and/or predict geological features. A loss model may determine an error and/or loss amount corresponding to the predicted indication of geological features and/or downhole dynamics (or lack thereof) that the machine learning model outputs (e.g., by comparing to the ground truth). The loss model may provide feedback to the machine learning model to tune the machine learning model (e.g., tune the one or more layers). In this manner, the machine learning model may be iteratively tuned or trained to learn a set of best-fit parameters that accurately generates the indication of geological features in the earth formation and/or downhole dynamics (or lack thereof). In this way, geological features and/or downhole dynamics of the earth formation may be determined based on any of the data of the downhole imaging system 820.

In some embodiments, the feature detection manager 823 performs one or more operations on image data it received (e.g., image data 730-1 to 730-3). For example, the feature detection manager 823 may alter, filter, smooth, reduce noise, or segment the image data. This may facilitate detecting one or more features in the data (e.g., data feature, borehole features, or geological features, downhole dynamics, etc.). For example, the feature detection manager 823 may alter the image data to locate discrete data objects in the image data which may facilitate identifying data features. In some embodiments, the feature detection manager 823 stores the altered image data to a data storage of the downhole imaging system 820 as feature data 829.

In some embodiments, the feature detection manager 823 morphologically opens the image data. For example, erosion and dilation operations may be applied to the image data to remove small data objects and/or smooth object boundaries while preserving larger structures in the image data. In another example, objects may be separated which may be touching and/or overlapping in the image data while preserving their size and/or shape. In this way, unwanted structures may be removed from the image data and/or image noise may be reduced, in at least one embodiment. This may facilitate identifying, for example, geological features of interest and/or downhole dynamics in the data. For example, the image data may include one or more geological features of one or more different types. Geological features of a first type may be identified in the image, and through morphologically opening the image, these features may be removed while geological features of a second type are preserved in the image data. In another example, geological features of a first type may be highlighted or distinguished from geological features of a second type through morphologically opening the image data. In another example, image data corresponding to downhole dynamics may be highlighted or distinguished from other image data using the morphology techniques discussed herein. In this way, the image data may be filtered to remove unwanted features, and/or to separate and/or distinguish features of interest, in at least one embodiment.

In some embodiments, a first portion of the image data is morphologically opened based on a first type of data feature (e.g., based on a first structuring element), and a second portion of the image data may be morphologically opened based on a second type of data feature (e.g., based on a second structuring element). For example, the first and second types of data features may correspond to first and second types of geological features, respectively. In another example, the first and second types of data features may correspond to first and second types of downhole dynamics, respectively. In another example the first type of data feature may correspond to a downhole dynamic and the second type of data feature may correspond to a geological feature. In some embodiments, the first and second portions of the image data are combined after morphologically opening in order to illustrate the first and second types of data features together. This may facilitate highlighting and/or distinguishing different types of data features and/or removing unwanted data features from the image data. The image data may be morphologically opened 2, 3, 4, 5, or more times based on 2, 3, 4, 5, or more types of data features. In this way, any number of types of data features may be identified, removed, highlighted, distinguished, etc.

In some embodiments, the feature detection manager 823 extracts summary statistics from the image data. For example, the summary statistics may be associated with a dimension, orientation, dynamic such as force, number of occurrences, any other characteristic of objects identified in the image data (e.g., geological features and/or downhole dynamics), or combinations thereof. The feature detection manager 823 may calculate and/or generate means, medians, percentiles, standard deviations, ranges, quartiles, other statistical values, or combinations thereof of one or more characteristics of the discrete objects identified in the image data. The summary statistics may be presented in the form of a histogram, curve, table, plot, graph, any other representation, or combinations thereof. The summary statistics may be stored in the data storage of the downhole imaging system as feature data 829.

In accordance with at least one embodiment of the present disclosure, the feature detection manager 823 receives engagement data mapped to environment data. For example, the feature detection manager may receive engagement data that is mapped to a pressure and/or a temperature of the downhole environment. In some embodiments, the engagement data is also mapped to rotation data, such that the engagement data corresponds to a local angle or rotational position in the reference frame. In some embodiments, the engagement data is additionally mapped to borehole data such that the engagement data is mapped to a global reference frame of the earth formation.

In some embodiments, the feature detection manager detects and/or determines (or facilitates detecting and/or determining) the presence of and/or access to a geothermal reservoir or vent in the borehole and/or in the earth formation. For example, as discussed herein, the feature detection manager may detect one or more borehole and/or geological features in the data it receives (e.g., by detecting corresponding data features). In some embodiments, these features corresponds to a crack, fracture, fissure, or the like present in the borehole. Based on the environment data (and based on its mapping to the engagement data), the feature detection manager 823 may determine that the presence of the feature in the engagement data corresponds to, for example, a change in the environment data at the same location in the borehole as the feature. For example, the feature detection manager may determine that a crack or fracture is present in the borehole at a given depth and may determine that an associated pressure and/or temperature within the borehole increased (e.g., suddenly or gradually) at, adjacent to, or near the crack or fracture. This increase in temperature and/or pressure may indicate that the crack is a geothermal well or vent, or that the crack is connected to and/or provides access to a geothermal well or vent (reservoir). For example, fluid, vapor, any other form of geothermal energy, and combinations thereof may flow into the borehole from the detected crack which may result in the increase in temperature and/or pressure. In some embodiments, the feature detection manager indicates the geothermal reservoir, for example, in feature data 829. In this way, the feature detection manager may determine (or facilitate determining) the presence of a geothermal reservoir based on the data 850. This may facilitate locating and/or harvesting geothermal energy from the earth formation.

In accordance with at least one embodiment of the present disclosure, the feature detection manager 823 detects and/or determines (or facilitates detecting and/or determining) whirl of a downhole tool (e.g., bit whirl). For example, as discussed herein, in some situations a downhole tool may rotate unevenly or unbalanced and may begin to whirl or wobble with respect to its axis of rotation, in a forward or backward direction. One or more data features in the engagement data may indicate the whirl, and the feature detection manager 823 may detect or may facilitate detecting the data feature and/or corresponding whirl. For example, as discussed in connection with FIG. 7-1, whirl of the downhole tool may be indicated by a data feature in the image data 730-1 as transverse lines overlaid or superimposed over one or more portions of an image of the image data 730-1. In some embodiments, the feature detection manager 823 detects the data feature corresponding to whirl by analyzing (or based on) the image data. In some embodiments, the feature detection manager 823 detects the data feature corresponding to whirl by analyzing (or based on) the underlying engagement data without analyzing image data (e.g., without the downhole imaging system generating an image such as image data 730-1). In this way, the feature detection manager may detect and/or facilitate detecting whirl. The feature detection manager 823 may indicate the data feature and/or whirl in feature data 829 and may store the feature data 829 to a storage device of the downhole imaging system 820.

In accordance with at least one embodiment of the present disclosure, the feature detection manager 823 detects and/or determines (or facilitates detecting and/or determining) stick slip of a downhole tool (e.g., of a bit). For example, as discussed herein, in some situations a downhole tool may hang up, get stuck (e.g., momentarily), or otherwise rotate inconsistently (e.g., may exhibit moments of higher rotational speed and/or moments of lower rotational speed). One or more data features in the engagement data may indicate stick slip, and the feature detection manager 823 may detect or may facilitate detecting the data feature and/or corresponding stick slip. For example, as discussed in connection with FIG. 7-1, stick slip of the downhole tool may be indicated by a data feature in the image data 730-1 as one or more instances of data rotationally out of phase, or data appearing disjointed, fragmented, or otherwise inconsistent. In some embodiments, the feature detection manager 823 detects the data feature corresponding to stick slip by analyzing (or based on) the image data. In some embodiments, the feature detection manager 823 detects the data feature corresponding to stick slip by analyzing (or based on) the engagement data without analyzing the image data (e.g., without the downhole imaging system generating an image such as image data 730-1). In this way the feature detection manager may detect and/or facilitate detecting stick slip. The feature detection manager 823 may indicate the data feature and/or stick slip in feature data 829 and may store the feature data 829 to a storage device of the downhole imaging system 820.

In this way, the feature detection manager 823 may detect whirl, stick slip, or any other downhole dynamic, and combinations thereof. This may facilitate making one or more decisions regarding the operation of the downhole tool and/or the drilling system. For example, based on detecting the downhole dynamic, one or more drilling parameters of the drilling system may be adjusted to compensate for and/or prevent and/or eliminate the downhole dynamic. For example, in some situations, a downhole dynamic (e.g., whirl or stick slip) may be associated with one or more drilling parameters such as a certain level of weight on bit, torque on bit, rotational speed, depth of cut, rate of penetration, any other drilling parameter, and combinations thereof. One or more of these drilling parameters, for example, may affect and/or contribute to the downhole dynamic based on one or more of a length of the drill string and/or borehole, an angle of the drill string and/or borehole, an orientation of the drill string and/or borehole, among others. Based on detecting downhole dynamics, a drilling parameter may be adjusted to compensate for any of the factors described herein in order to eliminate and/or reduce and/or prevent one or more downhole dynamics. This may facilitate preventing and/or mitigating damage to one or more downhole tools as well as improving efficiency of the drilling operation.

FIGS. 9-1 to 9-4 are associated with an example of a downhole tool 970 engaging an earth formation 901, according to at least one embodiment of the present disclosure. FIG. 9-1 includes example side views of the downhole tool 970 engaging the earth formation 901. FIG. 9-2 illustrates example top-down schematic views of the rotation of an engagement element 972 of the downhole tool 970 corresponding to the various views of FIG. 9-1. FIG. 9-3 illustrates example cross-section views of the engagement element 972 engaging the earth formation 901 corresponding with the various views of FIGS. 9-1 and 9-2. FIG. 9-4 illustrates example engagement data 933 corresponding to the various views of FIGS. 9-1 to 9-3. For ease of discussion, FIGS. 9-1 to 9-4 will be discussed together.

In some situations, the earth formation 901 includes an isotropic region 901-1. For example, the properties of the isotropic region 901-1 (e.g., grains, layers, deposits, etc.) may be substantially the same or uniform in all directions or orientations. In some situations, the earth formation 901 includes a transversely isotropic ("TI") region 901-2. For example, one or more properties of the TI region 901-2 may be substantially the same or uniform in two directions or orientations but may vary with respect to a third direction or orientation. In this way, the TI region 901-2 may exhibit one or more bedding planes 971 defined by the transversely isotropic nature of the TI region 901-2. In some embodiments, the bedding planes 971 and/or the TI region 901-2 exhibit a formation dip. For example, as shown in FIG. 9-1, the bedding planes 971 and/or the TI region 901-2 may not be substantially horizontal or may be oriented at an angle (not) 90° with respect to a horizontal plane.

As described herein, the downhole tool 970 (e.g., a bit) may engage the earth formation 901, for example, at or in a borehole in the earth formation 901. For example, the downhole tool 970 may rotate and/or may engage the earth formation (e.g., via the borehole) in a circular or cyclical path. As the downhole tool 970 rotates, one or more engagement elements 972 of the downhole tool 970 may experience dynamics (e.g., forces, stresses, pressures, etc.) based on properties of the earth formation 901. As discussed herein, the engagement of the engagement element 972 may be measured and/or recorded by one or more engagement sensors as engagement data 933 in FIG. 9-4. For example, the engagement element may measure force exerted on or exhibited by the engagement element 972 and the engagement data 933 may be force data. Based on the properties of the earth formation 901, or more specifically changes in the properties of the earth formation 901 with respect to the rotation of the downhole tool 970, the engagement data 933 may vary, for example, periodically as shown in FIG. 9-4 (e.g., on successive revolutions of the downhole tool 970). For example, as will be discussed herein, engagement data 933-1 to 933-4 of FIG. 9-4 illustrate examples of how variations in the properties of the earth formation 901 may correspond to variations in the engagement data 933. In some embodiments, the variations in the engagement data 933 facilitate determining, for example, a feature of the earth formation 901 such as the TI region 901-2, or a bedding plane with a formation dip.

In some embodiments, the engagement element 972 engages the earth formation with an engagement A (e.g., the engagement element 972 may exhibit and/or experience engagement A). Engagement A may correspond to the engagement element 972 engaging substantially uniform and/or unchanging properties of the earth formation 901 (with respect to the rotation of the downhole tool 970), such as when engaging the isotropic region 901-1. Similarly, engagement A may occur when engaging a transversely isotropic region at a perpendicular angle, such as a transversely isotropic region with a substantially horizontal bedding plane, or no formation dip. The engagement element 972 engaging the earth formation 901 with engagement A for an entirety of a revolution of the downhole tool 970 may result in little or negligible variations in the engagement dynamics. As shown in engagement data 933-1, this may correspond to little or negligible variations in the corresponding engagement data. In some embodiments, engagement A corresponds to a data feature A' in the engagement data 933. In some embodiments, data feature A' facilitates providing and/or establishing a baseline for which to compare and/or detect changing dynamics on the engagement element 972 and/or corresponding data features in the engagement data 933. For example, engagement data 933-1 illustrating substantially constant or uniform engagement of the engagement element 972 may indicate that the downhole tool 970 is positioned in the isotropic region 901-1. This may be detected or identifiable, for example, by a feature detection manager of a downhole imaging system as described herein.

In some embodiments, the engagement element 972 engages the earth formation with an engagement D. Engagement D may correspond to a parallel engagement of the engagement element 972 with the earth formation. For example, engagement D may occur when the engagement element 972 is moving substantially across, parallel to, or tangent to the bedding planes 971. This may also correspond to the engagement element 972 engaging the earth formation 901 in the direction of the strike of the formation. As can be seen in FIGS. 9-1 and 9-2, engagement D may occur once per revolution as the downhole tool moves through a transition region between the isotropic region 901-1 and the TI region 901-2 (e.g., as the downhole tool engages both regions simultaneously). Also as shown in FIG. 9-2, engagement D may occur twice per revolution when the downhole tool 970 is fully positioned in the TI region 901-2. The two instances of engagement D per revolution may occur 180° apart with respect to each revolution of the downhole tool 970.

Engagement D may correspond to a data feature D' in the engagement data 933. Data feature D' may be distinguishable as a variation in the engagement data 933, for example, as compared to data feature A'. The variation may be an increase or a decrease in a measured value in the engagement data 933, for example, compared to data feature A' or any other data feature. Data feature D' occurring once per revolution (as shown in engagement data 933-2) may correspond to the downhole tool 970 encountering a transition between the isotropic region 901-1 and the TI region 901-2. Data feature D' occurring twice per revolution (as shown in engagement data 933-4) may correspond to the downhole tool being fully positioned in the TI region 901-2. In this way, the engagement data 933 (e.g., including data feature D') may facilitate determining and/or detecting a bedding plane and/or a formation dip of the earth formation 901.

In some embodiments, the direction of the formation dip is determined based on detecting (one or more instances of) engagement D or data feature D'. For example, because engagement D corresponds to a parallel engagement of the engagement element 972 with the earth formation (e.g., engagement along the strike of the formation), the direction of the formation dip can be determined (e.g., perpendicular to the strike). Put another way, the formation dip may run along a diameter of the rotation of the downhole tool (e.g., the rotation shown in FIG. 9-2) containing (one or two instances of) data feature D' (e.g., cast to west). In some embodiments, more information and/or data features may be needed, for example, to identify up-dip and/or down-dip directions of the formation dip, such as data features B' and/or C', as will be discussed herein.

In some embodiments, the engagement element 972 engages the earth formation with an engagement B and/or and engagement C. Engagement B and engagement C may each correspond to a transverse engagement of the engagement element 972 with the earth formation. For example, engagement B may occur when the engagement element 972 is moving substantially down-dip, or when the bedding planes 971 are sloping downwards away from the engagement element 972, and engagement C may occur when the engagement element 972 is moving substantial up-dip, or when the bedding planes 971 are sloping upwards away from the engagement element 972 (or vice versa). Engagement B and engagement C may occur at opposite ends of a diameter of the rotation of the downhole tool 970 that is parallel to the strike of the earth formation 901.

Engagement B may correspond to a data feature B' in the engagement data 933. Engagement C may each correspond to a data feature C' in the engagement data 933. Data feature B' and data feature C' may each be distinguishable as a variation in the engagement data 933, for example, as compared to data feature A' and/or data feature D' and/or any other data feature. Data feature B' and data feature C' may each be distinguishable as variations in the engagement data 933 as compared to each other. The variations corresponding to data feature B' and data feature C' may increase and/or decrease with respect to any other data feature. Based on the increase and/or decrease corresponding to data feature B' and/or data feature C', data feature B' and/or data feature C' may correspond to the up-dip and/or down-dip directions. For example, in some situations, data feature C' corresponds to a higher measured engagement dynamic than feature B', which may correspond to engagement C being an up-dip engagement (or vice versa). In this way, the up-dip and/or down-dip direction of the formation may be determined in addition to the overall dip direction (and strike direction).

In this way, one or more instance of one or more of data feature A', data feature B', data feature C', data feature D', any other data feature, and combinations thereof may indicate the downhole tool 970 engaging an isotropic region and/or a transversely isotropic region of the earth formation 901. The various identifiable engagements A-D of the engagement element 972 may facilitate determining a geological feature of the earth formation, such as a formation dip and/or bedding plane.

The techniques described herein in connection to FIGS. 9-1 to 9-4 have been described with respect to engagement data 933 of FIG. 9-4 (e.g., engagement data 933-1 to 933-4). It should be understood that engagement data 933 is presented for illustrative purposes and is not necessarily exemplifying the form that engagement data 933 may take. For example, the engagement data 933 shown may illustrate data from downhole measurements in a basic and/or simplified form. In some embodiments, the engagement data 933 may appear more noisy, chaotic, stochastic, varying, etc. One or more operations may be performed on the engagement data 933 (e.g., by the downhole imaging system) to one or more of reduce and/or remove noise, organize, filter, correlate, simplify, or otherwise clean up (and combinations thereof) the engagement data 933. This may result in engagement data 933 that may more closely resemble that presented in FIG. 9-4.

Additionally, while the techniques described herein are described with respect to detecting "dip" generally, it should be understood that in some embodiments the techniques may be implemented to detect an "apparent dip" and/or a "true dip." For example, apparent dip may refer to a detected dip with respect to an orientation or an engagement of a downhole tool, but this dip may only be apparent in that the downhole tool may be, for example, angled with respect to the earth formation. The true dip may refer to the actual dip that is exhibited by the earth formation, and the true dip may be determined by, for example, orienting the apparent dip with respect to a global coordinate system and/or accounting for a direction and/or angle of the downhole tool with respect to the earth formation. In this way, detecting "dip" referred to herein generally may refer to detecting the "true dip" (e.g., directly), or detecting "apparent dip," for example, as an intermediate step in determining the true dip.

Additionally, it should be understood that the techniques described herein may be performed and/or facilitated by identifying changes or variations in the engagement data 933 in order to identify one or more data features as described herein. In this way, the techniques described herein are not dependent on, for example, the relative or absolute (real-world) value of the measurements in the engagement data (e.g., with respect to a real-world measure of force, stress, strain, etc.), but rather may be implemented based on changes in any arbitrary unit of measure (or no unit at all). Put another way, the sensor data may be unit agnostic, and/or the feature detection techniques described herein may be agnostic to any correct, precise, or accurate measure of any specific unit, for example, corresponding to any specific dynamic.

Additionally, the techniques described herein have been described with respect to one or more identified data features occurring with respect to a rotation of the downhole tool. It should be understood that any description of the data features as occurring "periodically" with respect to the rotation of the downhole tool is not meant to limit the data features occurring at the same (or substantially the same) position or degree in each period of the rotation. Rather, it should be understood that the data features occurring "periodically" includes the data features occurring during each period of a plurality of successive rotations of the downhole tool, whether at the same (or substantially the same) position and/or degree or different positions each period.

Further, the techniques just described have been described with respect to an engagement element (shown in FIG. 9-3) that is illustrated as cutting or degrading the formation such as a planar engagement element and/or a drag engagement element. It should be understood, however, that these techniques may be implemented with any engagement element for engaging the formation and are not limited to engagement elements that cut or that are primarily intended to cut.

FIG. 10 illustrates an example technique for determining downhole dynamics based on example engagement data 1033, according to at least one embodiment of the present disclosure.

In some situations, the behavior of a downhole tool (e.g., a bit) and/or the dynamics experienced by the downhole tool may be modeled and/or predicted. For example, in some situations the torque and/or the depth of cut of a downhole tool may be modeled with respect to weight on bit ("WOB") applied to the downhole tool. The torque and/or depth of cut may be associated with and/or related to a rate of penetration ("ROP") of the downhole tool, which can typically be a valuable metric for characterizing the operation of a drilling system effectively. Any number of models may be implemented to represent and/or characterize downhole dynamics based on any number of observable parameters. For example, a bit-rock interaction model ("BRIM") may be implemented in order to facilitate the techniques described herein. It should be understood that the techniques described herein are not limited to implementations solely based on the BRIM but may be implemented based on any model representative of the behavior and/or dynamics of a downhole tool.

Based on the BRIM, the dynamics of the downhole tool may be modeled by a piecewise-continuous linear function (e.g., shown in feature data 1029 of FIG. 10 as will be described herein) having three distinct phases. A first phase X of the function may be characterized as a friction region, where an engagement element experiences friction with the formation upon initial engagement. The engaged rock can support an initial level of normal stress resulting in frictional forces on the engagement element until a critical depth of cut is reached and the engagement element begins cutting. This is signified by a transition into a pure cutting phase, or second phase Y of the function. In the second phase Y, the engagement element is driven further into the rock by the WOB resulting in proportional increases in ROP (e.g., represented by bit torque and/or depth of cut). The second phase Y may typically be a production phase or an efficient phase of a drilling operation. However, as WOB further increases, drilling performance eventually degrades due to any number of mechanisms including stick slip, whirl, bit balling, etc. This point where diminished returns in performance (or even decreased performance) begins is typically known as bit founder, and defines the transition from the second phase Y to a third phase Z. In the third phase Z, increased WOB will not result in proportional increases in productivity, and in some cases may result in decreases in performance. In this way, the piecewise relationship may define and/or characterize the behavior of the downhole tool throughout a range of applied WOB.

Knowing the piecewise relationship corresponding to a certain downhole tool and/or formation (and/or combination) may be advantageous for effectively operating the downhole tool. For example, in order to maximize production, it may be desirable to know where the point of bit founder may occur in order to operate the downhole tool in the second phase Y without passing the point of bit founder into the less productive third phase Z. In another example, it may be desirable to minimize wear by operating the downhole tool near the beginning of the second phase Y without transitioning into the less productive first phase X. In this way, the piecewise relationship based on the BRIM may facilitate determining one or more downhole dynamics associated with the downhole tool, such as determining (or predicting) a ROP for a given WOB.

Based on the BRIM, the behavior or any downhole tool engaging any earth formation may be characterized by defining a piecewise-continuous linear relationship (function). However, the exact shape and/or the exact values defining the function may be unique to each downhole tool and/or earth formation (and/or specific combinations of both). For example, each downhole tool may exhibit a unique level or pattern of wear and/or the earth formation may exhibit different and/or varying material properties, which may all affect and/or determine the piecewise relationship. Thus, the piecewise relationship associated with a given downhole tool and/or earth formation may not be readily obtainable. For example, in some situations the piecewise relationship can be determined by operating the downhole tool through a range of WOB and measuring the corresponding response on the downhole tool. However, this may be burdensome and/or cost significant time and resources. This time and burden may be multiplied when considering that changing bit and/or formation properties may necessitate periodically reassessing and/or determining the piecewise relationship. As such, it may be advantageous to implement a method of generating and/or predicting the piecewise relationship (or any other downhole dynamics relationship) based on the BRIM (or any other model) for a given downhole tool and/or earth formation.

As described herein, an engagement sensor may measure and/or take engagement data 1033 corresponding to an engagement of a downhole tool with an earth formation. In accordance with at least one embodiment of the present disclosure, the engagement data 1033 may include force measurements corresponding to a force exerted on or exhibited by the instrumented engagement element. In some embodiments, the engagement data 1033 includes multiple different force measurements, or force measurements corresponding to multiple axes of the engagement with the earth formation. For example, as shown in FIG. 10, the engagement data 1033 may include measurements of normal force and shear force on the instrumented engagement element (e.g., measured by multiple sensors, or a multi-axis sensor). The force measurements of the engagement data 1033 may be related or associated together, such as shear force with respect to normal force, as shown. In some embodiments, the engagement data 1033 includes geometry measurements related to a geometry of the downhole tool. For example, the geometry measurements may include measurements of a depth of cut and/or a groove area of an instrumented engagement element of the downhole tool. The depth of cut may be a measure of the depth at which the instrumented engagement element penetrates and/or cuts into the earth formation. The groove area may be a cross-sectional area of the groove that the instrumented engagement element cuts into the earth formation. In some embodiments, the geometry measurements are determined based on a known geometry of the downhole tool, such as based on a CAD model or a physical model of the downhole tool. In some embodiments, the geometry measurements are sensed and/or taken by one or more sensors for taking geometry measurements associated with the downhole tool. The engagement data 1033 may relate or associate together the depth of cut and the groove area, such as groove area with respect to depth of cut.

In some embodiments, the downhole tool includes two or more instrumented engagement elements for taking two or more sets of engagement data 1033, or the engagement data 1033 may include measurements corresponding to two or more engagements of the downhole tool with the earth formation. For example, two or more instrumented engagement elements may be positioned on the downhole tool at different radii and/or with different geometries (e.g., groove areas and/or depths of cut). In this way, the engagement data 1033 may include measurements from multiple different instrumented engagement elements each measuring multiple dynamics (e.g., forces) associated with the engagement of the downhole tool with the earth formation. In this way, the engagement data 1033 may include first engagement and data second engagement data (and third engagement data and so on for any number of instrumented engagement elements).

In accordance with at least one embodiment of the present disclosure, the engagement data 1033 may include a first data set 1033-1, a second data set 1033-2, and a third data set 1033-3 (collectively "data sets") corresponding to first, second, and third instrumented engagement elements respectively. The data sets may each include force data and geometry data. The force data may include normal force data and shear force data, and the geometry data may include depth of cut data, and groove area data (e.g., corresponding with geometry associated with respective instrumented engagement elements). In this way, the multiple data sets of the engagement data 1033 may each include multiple measurements of different types and may each correspond to a distinct instrumented engagement element in order to facilitate determining one or more downhole dynamics as discussed herein (e.g., to facilitate determining the piecewise relationship described herein).

The data sets may each be comprised of a plurality of measurements or data points. For example, each data set may be defined by a grouping or cloud 1073 of measurements. Each cloud 1073 may be linear or generally linear in nature such that a line of best fit 1074 may be generated or fit to each data set. For example, a regression model may be implemented in order to fit the lines of best fit 1074 to each of the data sets. In some embodiments, each of the lines of best fit 1074 has substantially the same slope. Generating the lines of best fit 1074 may be a form of mapping the engagement data 1033, for example, by a mapping engine of the downhole imaging system.

As shown, each of the data sets may correspond with a distinct intercept (e.g., x-intercept) of the line of best fit 1074. The different intercepts may be due to different levels of friction and/or different amounts of wear associated with each of the instrumented engagement elements. For example, each of the instrumented engagement elements may transition from the first phase X to the second phase Y at a distinct location or corresponding to a distinct amount of observed normal force. This may be based on a unique positioning of each instrumented engagement element (e.g., at a specific radius of the downhole tool) and/or a unique level of wear of each of the instrumented engagement elements. In some embodiments, the data sets are adjusted or modified, for example, to align the intercepts. This may be a form of mapping the engagement data 1033. For example, as shown in the mapped data 1028 (e.g., generated by a mapping engine as described herein), the data sets may be adjusted such that they all lie on the same line or curve, or such that each of the lines of best fit 1074 are the same line. In some embodiments, the clouds 1073 of measurements are represented entirely or partially in the mapped data 1028 or may be represented by a single data point in the mapped data 1028. For example, one or more operations may be performed on the cloud 1073 of measurements to reduce or average one or more measurements of the clouds 1073 to a single data point. In some embodiments, the mapped data 1028 is generated based on the geometry data of the engagement data (e.g., groove area data and/or the depth of cut data). For example, the shear force vs normal force data of the mapped data 1028 may be generated, at least in part, based on the geometry data. In another example, groove area vs normal force data of the mapped data 1028 may be generated, at least in part, based on the geometry data. In some embodiments, additional data 1075 is used to generate the mapped data 1028. The additional data 1075 may be additional engagement data and/or other downhole measurements from other sensors of the drilling system. In some embodiments the additional data 1075 facilitates determining a bit founder point associated with the engagement data 1033 and/or the mapped data 1028. In this way, the engagement data 1033 (e.g., force data and/or geometry data) may be used to generate the mapped data 1028. In some embodiments, the mapped data 1028 is generated by a mapping engine of a downhole imaging system.

Based on the mapped data 1028, one or more downhole dynamics may be determined. For example, a piecewise relationship, as discussed herein, associated with the downhole tool and/or the earth formation may be determined. The piecewise relationship may relate WOB to bit torque, depth of cut, ROP, or combinations thereof. The piecewise relationship may be included in or represented by feature data 1029. In some embodiments, a feature detection manager of the downhole imaging system determines the piecewise relationship and/or the feature data 1029. The piecewise relationship may be determined from the mapped data 1028 based on the BRIM. For example, the BRIM (or any model implemented in accordance with the techniques described herein) may define one or more equations and/or relationships to facilitate calculating and/or transforming the shear force vs normal force data and/or the groove area data vs normal force data into the piecewise relationship of feature data 1029.

In this way the piecewise relationship associated with the downhole tool may be predicted and/or estimated. This may be in contrast, for example, to having to measure a variety of downhole tool responses throughout a range of WOB on the downhole tool in order to generate (e.g., plot) the piecewise relationship. This may provide the advantage of determining the piecewise relationship while drilling (e.g., real time) and/or without having to adjust one or more drilling parameters (e.g., WOB) in order to determine the piecewise relationship. Additionally, the feature data 1029 in this way may be generated any number of times, periodically and/or continually, in order to determine the piecewise relationship. This may facilitate adapting and/or adjusting to a progressing wear state of the downhole tool and/or changing properties of the downhole formation. For example, one or more drilling parameters may be adjusted based on a periodically or continually updated piecewise relationship of feature data 1029. In this way, the feature data 1029 may help to ensure an efficient and/or effective operation of the downhole tool based on changing downhole circumstances.

FIG. 11 illustrates an example flow of information between components of a downhole imaging system 1120, according to at least one embodiment of the present disclosure. In some embodiments, the downhole imaging system 1120 includes a mapping engine 1122 and a communication module 1125.

In some embodiments, the communication module 1125 receives data 1150. For example, the communication module 1125 may receive sensor data, mapped data, image data, feature data, borehole data, any other data accessible to the downhole imaging system 1120, or combinations thereof. In some embodiments, the communication module 1125 receives the data 1150 from the mapping engine 1122. In some embodiments, the communication module 1125 receives the data 1150 by accessing a data storage of the downhole imaging system 1120. The communication module 1125 may transmit any of the data 1150 it receives.

The communication module 1125 may be configured to communicate with one or more downhole devices 1119 (e.g., drilling devices, milling devices, reaming devices, stabilizing devices, steering devices, surface devices, other downhole devices, or combinations thereof). In some embodiments, the communication module 1125 is configured to communicate with the downhole devices 1119 over a physical data connection. For example, the communication module 1125 may include or be in data communication with one or more physical data ports for electronically transferring information over a cable and/or a wired connection. In some embodiments, the communication module 1125 is configured to communicate with the downhole devices 1119 wirelessly. For example, the communication module 1125 may be configured to wirelessly communicate using Bluetooth, near field communication ("NFC"), Wi-Fi, LoRa, an Industrial Internet of Things ("IIoT") protocol, or any other form of wireless communication. In some embodiments, the communication module 1125 is configured for long range wireless communication such as GPS, radio, cellular network, etc.

In some embodiments, the downhole devices 1119 include computing devices located at the surface of the borehole. For example, the downhole devices 1119 may include a computing device associated with a drill rig of a drilling system, a mobile device, or any other type of computing device, and the communication module 1125 may transmit data 1150 to the computing device at the surface. In some embodiments, the downhole devices 1119 include computing devices located in the borehole. For example, one or more components of the drilling system located in the borehole may include a computing device and the communication module 1125 may transmit data 1150 to the computing device in the borehole. One or more components of the downhole imaging system 1120 may be located in the borehole or at the surface. For example, a computing device implementing the downhole imaging system 1120 may include a computing device located on a downhole tool and/or may include a surface computing device. In this way, the communication module 1125 may transmit data 1150 to any number of downhole devices 1119 located at any location in relation to the drilling system.

FIG. 12 illustrates a flow diagram for a method 1260 or a series of acts for identifying a geothermal reservoir of an earth formation as discussed herein, according to at least one embodiment of the present disclosure. While FIG. 12 illustrates acts according to one embodiment, alternative embodiments may omit, add to, reorder, or modify any of the acts shown in FIG. 12.

The method 1260 may include an act 1261 of receiving engagement data from an engagement sensor. The engagement data may correspond to an engagement with a borehole. For example, a downhole tool may include an instrumented engagement element having an engagement sensor. The instrumented engagement element may be located and/or positioned in the downhole tool to engage the borehole wall. The engagement data may correspond to an engagement of the instrumented engagement element with a borehole in the earth formation. In some embodiments, the engagement data is taken or measured during an operation of the downhole tool. For example, the engagement data may be taken while drilling with a bit. In some embodiments, the instrumented engagement element is in a blade of the downhole tool. In some embodiments, the engagement sensor is a force sensor and the engagement data is force data.

The method 1260 may include an act 1262 of receiving environment data from an environment sensor. The environment data may correspond to a downhole environment of the engagement data. For example, the environment data may correspond to a pressure and/or temperature at one or more locations in the borehole. In some embodiments the environment data corresponds with the engagement data. For example, the engagement data may be associated with a depth in the borehole, and the environment data may also be associated with the depth. In some embodiments, the environment data is taken during an operation of the downhole tool (e.g., while drilling).

The method 1260 may include an act 1263 of mapping the engagement data to the environment data to generate mapped engagement data. For example, one or more instances of the engagement data may be mapped to or associated with one or more instances of pressure and/or temperature of the environment data. In some embodiments, the engagement data is mapped to rotation data. For example, the engagement data may be mapped to a rotational position and/or angle. In this way, the engagement data may be oriented (e.g., locally) with respect to the borehole. In some embodiments, the oriented engagement data is mapped to a global reference frame. For example, the oriented engagement data may be mapped to one or more of an azimuth, an inclination, a latitude and longitude of the borehole, other reference frames, or combinations thereof.

In some embodiments, the method 1260 includes identifying a geothermal reservoir of the earth formation based on the mapped engagement data. For example, a geological feature may be determined based on the engagement data. The geological feature may be a crack or a fracture in the earth formation. Determining the geothermal reservoir may be based on mapping the environment data to the geological feature. For example, one or more changes in the environment data may be detected and/or identified, such as a change in pressure and a change in temperature. Determining the geothermal reservoir may be based on determining that the change in pressure and/or temperature is associated with the crack or fracture in the earth formation.

FIG. 13 illustrates a flow diagram for a method 1360 or a series of acts for determining a geological feature of an earth formation as discussed herein, according to at least one embodiment of the present disclosure. While FIG. 13 illustrates acts according to one embodiment, alternative embodiments may omit, add to, reorder, or modify any of the acts shown in FIG. 13.

The method 1360 may include an act 1361 of receiving sensor data from a downhole sensor. The sensor data may correspond to an engagement with a borehole. For example, a downhole tool may include an instrumented engagement element having a downhole sensor. The instrumented engagement element may be located and/or positioned in a blade of the downhole tool. The sensor data may correspond to an engagement of the instrumented engagement element with a borehole in the earth formation. In some embodiments, the sensor data is taken or measured during an operation of the downhole tool. For example, the sensor data may be taken while drilling with a bit. In some embodiments, the downhole sensor is a force sensor, and the sensor data is force data. In some embodiments, the sensor data is unit agnostic, or may not correspond to an accurate or precise measure of any real-world dynamic (e.g., such as force, stress, pressure, etc.).

The method 1360 may include an act 1362 of defining a data feature in the sensor data. For example, the data feature may correspond with one or more instances of interest in the sensor data, such as a measurement past a threshold level or a change in a measurement past a threshold level.

The method 1360 may include an act 1363 of determining a bedding plane of the earth formation. For example, the bedding plane may be determined based on identifying a plurality of instances of the data feature that each occur periodically with respect to the rotation of the downhole tool. For example, a data feature may occur in a plurality of revolutions (e.g., successive) of the downhole tool. The data feature may occur at the same or similar (or adjacent) locations with respect to the revolutions of the downhole tool. This may indicate or may be associated with the downhole sensor repeatedly sensing a physical feature of the borehole, and in this way the sensor data may correspond or may be attributed to a geological feature in the earth formation, such as the bedding plane. In some embodiments, the bedding plane has a formation dip. The bedding plane may be transversely isotropic. In some embodiments, the downhole tool engages the bedding plane at an angle relative to the formation dip. The angle may be an angle that is substantially not 90°. For example, the bedding plane may be substantially not horizontal.

In some embodiments, the data feature occurs once per revolution of the downhole tool. For example, the data feature may correspond to a transverse engagement of the instrumented engagement element with the bedding plane of the earth formation. In another example, the data feature may correspond to a parallel engagement of the instrumented engagement element with the bedding plane. In some embodiments, determining the bedding plane includes identifying that the data feature occurs twice per revolution of the downhole tool. For example, the data feature may correspond to a parallel engagement of the instrumented cutting element with the bedding plane, and the data feature occurring twice per revolution may be associated with the downhole tool fully positioned in the bedding plane (e.g., as opposed to positioned in a transition region between the bedding plane and another portion of the earth formation).

The method 1360 may include determining a dip direction of the formation dip. The dip direction may correspond with a diameter defined between two instances of the data feature per revolution of the downhole tool.

FIG. 14 illustrates a flow diagram for a method 1460 or a series of acts for determining downhole dynamics of a drilling system as discussed herein, according to at least one embodiment of the present disclosure. While FIG. 14 illus-trates acts according to one embodiment, alternative embodiments may omit, add to, reorder, or modify any of the acts shown in FIG. 14.

The method 1460 may include an act 1461 of receiving engagement data from an engagement sensor. The engagement data may correspond to an engagement with a borehole. For example, a downhole tool may include an instrumented engagement element having an engagement sensor. The instrumented engagement element may be located and/or positioned in a blade of the downhole tool. The engagement data may correspond to an engagement of the instrumented engagement element with a borehole in the earth formation. In some embodiments, the engagement data is taken or measured during an operation of the downhole tool. For example, the engagement data may be taken while drilling with a bit. In some embodiments, the engagement sensor is a force sensor, and the engagement data is force data.

The method 1460 may include an act 1462 of detecting a downhole dynamic of the downhole tool. The downhole dynamic may be detected based on identifying a data feature in the engagement data. The downhole dynamic may be whirl and/or stick slip of the downhole tool. In some embodiments, a drilling parameter of the drilling system is adjusted based on detecting the downhole dynamic. In some embodiments, a drilling parameter is adjusted based on detecting one or more additional measurements, such as acceleration and/or temperature measurements.

FIG. 15 illustrates a flow diagram for a method 1560 or a series of acts for determining downhole dynamics as discussed herein, according to at least one embodiment of the present disclosure. While FIG. 15 illustrates acts according to one embodiment, alternative embodiments may omit, add to, reorder, or modify any of the acts shown in FIG. 15.

The method 1560 may include an act 1561 of receiving first engagement data from a first engagement sensor. The first engagement data may correspond to a first engagement with a borehole. For example, a downhole tool may include a first instrumented engagement element having a first engagement sensor. The first instrumented engagement element may be located and/or positioned in a blade of the downhole tool. The first engagement data may correspond to a first engagement of the first instrumented engagement element with a borehole in the earth formation. In some embodiments, the first engagement data is taken or measured during an operation of the downhole tool. For example, the first engagement data may be taken while drilling with a bit. In some embodiments, the first engagement sensor is a force sensor, and the first engagement data is first force data. In some embodiments, the first engagement data includes two-axis force data. For example, the two-axis force data may include normal force data and shear force data. In some embodiments, the first engagement data includes geometry data. For example, the geometry data may include depth of cut data and groove area data corresponding to the first instrumented engagement element.

The method 1560 may include an act 1562 of receiving second engagement data from a second engagement sensor. The second engagement data may correspond to a second engagement with the borehole. For example, the downhole tool may include a second instrumented engagement element having a second engagement sensor. The second instrumented engagement element may be located and/or positioned in a blade of the downhole tool. The second engagement data may correspond to a second engagement of the second instrumented engagement element with a borehole in the earth formation. In some embodiments, the second engagement data is taken or measured during an operation of the downhole tool. For example, the second engagement data may be taken while drilling with a bit. In some embodiments, the second engagement sensor is a force sensor, and the second engagement data is second force data. In some embodiments, the second engagement data includes two-axis force data. For example, the two-axis force data may include normal force data and shear force data. In some embodiments, the second engagement data includes geometry data. For example, the geometry data may include depth of cut data and groove area data corresponding to the second instrumented engagement element.

The method 1560 may include an act 1563 of mapping the first engagement data to the second engagement data. For example, this may generate mapped engagement data. In some embodiments, mapping includes adjusting the first and/or second engagement data for wear of the first and/or second instrumented engagement element (respectively). For example, mapping may include aligning a first line of best fit of the first engagement data and a second line of best fit of the second engagement data.

In some embodiments, the method includes determining a downhole dynamic of the downhole tool based on the mapped engagement data. In some embodiments, a drilling parameter of the drilling system is adjusted based on determining the downhole dynamic. In some embodiments, the downhole dynamic is determined based on a bit-rock interaction model. For example, the bit-rock interaction model may define one or more equations and/or one or more relationship between one or more observable downhole parameters of the downhole tool. The bit-rock interaction model may facilitate determining downhole dynamics based on one or more observable (e.g., sensed) parameters of the downhole tool. In some embodiments, the bit-rock interaction model includes a friction phase, a production phase, and a founder phase to represent a behavior of the downhole tool. For example, the bit-rock interaction model may include and/or define a relationship between a rate of penetration of the downhole tool and a weight on bit of the downhole tool. The relationship may be a piecewise linear relationship. For example, three phases described herein (e.g., friction, production, founder) may each be represented by a distinct segment of the piecewise linear relationship.

FIG. 16 illustrates certain components that may be included within a computer system 1600. One or more computer systems 1600 may be used to implement the various devices, components, and systems described herein.

The computer system 1600 includes a processor 1601. The processor 1601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1601 may be referred to as a central processing unit (CPU). Although just a single processor 1601 is shown in the computer system 1600 of FIG. 16, in an alternative configuration, a combination of processors (e.g., an ARM and DSP) could be used.

The computer system 1600 also includes memory 1603 in electronic communication with the processor 1601. The memory 1603 may be any electronic component capable of storing electronic information. For example, the memory 1603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1605 and data 1607 may be stored in the memory 1603. The instructions 1605 may be executable by the processor 1601 to implement some or all of the functionality disclosed herein. Executing the instructions 1605 may involve the use of the data 1607 that is stored in the memory 1603. Any of the various examples of modules and components described herein may be implemented, partially or wholly, as instructions 1605 stored in memory 1603 and executed by the processor 1601. Any of the various examples of data described herein may be among the data 1607 that is stored in memory 1603 and used during execution of the instructions 1605 by the processor 1601.

A computer system 1600 may also include one or more communication interfaces 1609 for communicating with other electronic devices. The communication interface(s) 1609 may be based on wired communication technology, wireless communication technology, or both. Some examples of communication interfaces 1609 include a Universal Serial Bus (USB), an Ethernet adapter, a wireless adapter that operates in accordance with an Institute of Electrical and Electronics Engineers (IEEE) 1102.11 wireless communication protocol, a Bluetooth wireless communication adapter, and an infrared (IR) communication port.

A computer system 1600 may also include one or more input devices 1611 and one or more output devices 1613. Some examples of input devices 1611 include a keyboard, mouse, microphone, remote control device, button, joystick, trackball, touchpad, and lightpen. Some examples of output devices 1613 include a speaker and a printer. One specific type of output device that is typically included in a computer system 1600 is a display device 1615. Display devices 1615 used with embodiments disclosed herein may utilize any suitable image projection technology, such as liquid crystal display (LCD), light-emitting diode (LED), gas plasma, electroluminescence, or the like. A display controller 1617 may also be provided, for converting data 1607 stored in the memory 1603 into text, graphics, and/or moving images (as appropriate) shown on the display device 1615.

The various components of the computer system 1600 may be coupled together by one or more buses, which may include a power bus, a control signal bus, a status signal bus, a data bus, etc. For the sake of clarity, the various buses are illustrated in FIG. 16 as a bus system 1619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Both non-transitory computer-readable storage media (devices) and transmission media may be used temporarily to store or carry, software instructions in the form of computer readable program code that allows performance of embodiments of the present disclosure. Non-transitory computer-readable storage media may further be used to persistently or permanently store such software instructions. Examples of non-transitory computer-readable storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored as or in software, hardware, firmware, or combinations thereof.

A "network" or "communications network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instructions or data structures and which can be accessed by a general purpose or special purpose computer.

Further, upon reaching various computer system components, program code in the form of computer-executable instructions or data structures can be transferred automatically or manually from transmission media to non-transitory computer-readable storage media (or vice versa). For example, computer-executable instructions or data structures received over a network or data link can be buffered in memory (e.g., RAM) within a network interface module (NIC), and then eventually transferred to computer system RAM and/or to less volatile non-transitory computer-readable storage media at a computer system. Thus, it should be understood that non-transitory computer-readable storage media can be included in computer system components that also (or even primarily) utilize transmission media.

INDUSTRIAL APPLICABILITY

The present disclosure includes a number of practical applications having features described herein that provide benefits and/or solve problems associated with identifying and/or characterizing geological features of an earth formation and/or downhole dynamics. Some example benefits are discussed herein in connection with various features and functionalities provided by a downhole imaging system implemented on one or more computing devices. It will be appreciated that benefits explicitly discussed in connection with one or more embodiments described herein are provided by way of example and are not intended to be an exhaustive list of all possible benefits of the downhole imaging system and further are not intended to limit the scope of the claims.

For example, in order to effectively plan and execute drilling operations, it can be critical to identify and/or map geological features and/or structures of an earth formation or of a reservoir. The downhole imaging techniques discussed herein may detect and/or facilitate detecting geological features of the earth formation such as cracks, fractures, formation boundaries, formation angles, bedding planes etc. Identifying and/or understanding such geological features can be invaluable for determining, for example, where underground resources may be located, how to drill through and/or penetrate certain formations, well completion strategies, risk factors associated with certain formations, among other factors. Thus, implementing the downhole imaging techniques described herein to detect and/or map geological features of the earth formation may provide significant cost, time, and/or resource savings by providing a better understanding of the formations being drilled, as well as an increased confidence in the features presumed to be present in the earth formation.

In addition to generally detecting geological features, the downhole imaging techniques described herein can generate images of the borehole to facilitate determining and/or confirming geological features. For example, engagement measurements associated with geological features may be transformed into photograph-like images of the borehole which may facilitate determining the location, orientation, size, or general presence of geological features. Indeed, the downhole imaging techniques described herein may in essence provide a photograph resembling the borehole.

Further, one or more techniques described herein may be useful for detecting and/or determining one or more downhole dynamics. For example, during downhole operations (e.g., drilling) a downhole tool may exhibit a variety of behaviors such as stick slip and/or whirl. These behaviors may be associated with an inefficient operation of the downhole tool and/or potential damage to one or more drilling components. Determining the occurrence of these dynamics may facilitate making critical decisions regarding the operation of the drilling system in order to ensure that the downhole tool is operating properly. In another example, implementing the techniques described herein to determine downhole dynamics such as ROP, torque on bit, depth of cut, etc., may be advantageous for ensuring an efficient and effective operation of the downhole tool. In this way, the techniques described herein may facilitate a more complete understanding of the operation of the drilling system as a whole.

Additionally, some conventional borehole surveying and/or characterization methods require specialized tools implemented in the borehole, for example, by stopping or pausing drilling operations. In some cases, drilling tools must be removed from the borehole to perform conventional imaging techniques, resulting in costly downtime of the drilling system. The borehole images described herein may be generated based on data taken during drilling operations, and in some situations the images may also be generated during drilling operations or in real time. In this way, the earth formation may be mapped and/or characterized without the downtime expenses of some conventional methods, resulting in cost and resource savings. As such, a variety and/or any number of images may be generated of the borehole, for example, at any depth and/or for any duration (e.g., length) of the borehole. In contrast, the downtime associated with some conventional borehole characterization techniques may impose practical limits to how much or how long such techniques may be implemented. Indeed, the imaging techniques described herein may realistically be implemented to image any portion (or an entirety) of a borehole with little to no operational limits on duration, detail, etc.

Some conventional borehole surveying and/or characterization methods require specialized tools implemented in the borehole as part of the drilling tool assembly and/or as part of a bottom hole assembly ("BHA"), such as measurement-while-drilling (MWD) and/or logging-while-drilling (LWD) tools. MWD and LWD tools are often implemented above or uphole from one or more downhole (e.g., drilling) tools such as a bit or reamer. MWD and LWD tools may take measurements and/or facilitate generating images associated with the borehole. However, because these tools are located uphole of the drilling tools (e.g., up to 100 ft), any information gathered by these measurement tools is effectively delayed with respect to the drilling tools located further downhole. In other words, MWD and LWD tools do not realistically characterize downhole dynamics as the drilling tools interact with the formation and/or characterize the earth formation proximate a point of engagement of the drilling tools. Due to this, conventional tools can have practical limits on their usefulness for making real-time decisions regarding the operation of the drilling tools located further downhole. In contrast, the techniques described herein may be implemented to take measurements at a point of engagement of one or more drilling tools with the earth formation. In this way, real-time information relevant to an immediate proximity of the drilling tools may be used to inform decisions about the operation of the drilling tools, such as decisions related to steering of one or more drilling components, drilling speed, rate of penetration, weight on bit, stopping one or more drilling components, adjusting any other drilling parameter, and combinations thereof.

Further, while conventional MWD and LWD tools may take measurements and/or facilitate generating images of the borehole, such measurements and/or images are typically of limited resolution. The imaging techniques of the present disclosure may generate images of improved resolution over, for example, conventional borehole images. MWD and LWD imaging tools are also typically quite expensive to both manufacture and to implement downhole. Exposing expensive instrumentation to the harsh downhole environment presents the possibility that the instrumentation may become damaged or lost. In contrast, the imaging techniques described herein may be implemented through simple and inexpensive instrumentation in connection with engagement elements that may already be designed and/or configured to withstand the harsh environment downhole. The instrumentation of the present disclosure may also be implemented into existing downhole tools or as a retrofit of existing tools, further adding to the simplicity and cost savings.

The following non-limiting examples are illustrative of the various permutations contemplated herein.

In some embodiments, a method of imaging an earth formation includes identifying engagement data corresponding to an engagement with a borehole in the earth formation. In some embodiments, an engagement sensor is on an instrumented engagement element of a downhole tool, and engagement data corresponds to an engagement of the instrumented engagement element with the borehole. In some embodiments, the engagement sensor is a force sensor, and the engagement data is force data. In some embodiments, the engagement data is transmitted to a drilling device. In some embodiments, engagement measurements are taken while drilling. In some embodiments, rotation data is identified from a rotation sensor, the rotation data corresponding to a rotational orientation of the engagement data with respect to the borehole. In some embodiments, the rotation data is transmitted to a drilling device. In some embodiments, the rotation data is taken while drilling. In some embodiments, the engagement data is mapped to the rotation data to generate oriented engagement data. In some embodiments, the oriented engagement data is transmitted to a drilling device. In some embodiments, a borehole feature is determined based on the oriented engagement data. In some embodiments, an image of the borehole is generated based on the oriented engagement data, the image presents the engagement data with respect to the rotation data and the image illustrates one or more geological features of the earth formation. In some embodiments, depth data is identified from a depth sensor, the depth data corresponding to a depth of the engagement data with respect to the borehole. In some embodiments, the depth data is taken while drilling. In some embodiments, the depth data is transmitted to a drilling device. In some embodiments, the engagement data is mapped to the depth data to generate mapped engagement data. In some embodiments, the mapped engagement data is transmitted to a drilling device. In some embodiments, a borehole feature is determined based on the mapped engagement data. In some embodiments, an image is generated of the borehole based on the mapped engagement data, the image presents the engagement data with respect to the depth data and the image illustrates one or more geological features of the earth formation. In some embodiments, environment data is identified from an environment sensor, the environment data is associated with a downhole environment of the engagement data. In some embodiments, the environment data is taken while drilling. In some embodiments, the method further comprises, transmitting the environment data. In some embodiments, the engagement data is mapped to the environment data to generate mapped engagement data. In some embodiments, the mapped engagement data is transmitted to a drilling device. In some embodiments, an image is generated of the borehole based on the mapped engagement data, wherein the image presents the engagement data with respect to the environment data and wherein the image illustrates one or more geological features of the earth formation. In some embodiments, the environment data include one or more of a downhole pressure and a downhole temperature of the borehole. In some embodiments, borehole data is identified corresponding to a global reference frame of the earth formation in which the borehole is located. In some embodiments, the borehole information is transmitted to a drilling device. In some embodiments, the engagement data is mapped to the borehole data to orient the engagement data with respect to the global reference frame of the earth formation, and wherein the mapping generates globally oriented engagement data. In some embodiments, the globally oriented engagement data is transmitted. In some embodiments, mapping the engagement data to the borehole data includes mapping the engagement data to one or more of an azimuth of the borehole, an inclination of the borehole, and a latitude and longitude of the borehole. In some embodiments, a geological feature of the earth formation is determined based on the globally oriented engagement data. In some embodiments, an image of the borehole is generated based on the globally oriented engagement data, wherein the image presents the engagement data with respect to the global reference frame of the earth formation, and wherein the image illustrates one or more geological features of the earth formation.

In some embodiments, generating an image of the borehole is based, at least in part, on the engagement data. In some embodiments, generating the image includes applying a color scale to represent a magnitude of the engagement data. In some embodiments, the image is generated while drilling with the downhole tool. In some embodiments, each line of resolution of the image corresponds to a revolution of the downhole tool. In some embodiments, determining a geological feature of the earth formation is based, at least in part, on the engagement data. In some embodiments, determining the geological feature of the earth formation includes defining a data feature corresponding to a threshold change in a magnitude of the engagement data; and identifying one or more instances of the data feature associated with a plurality of successive revolutions of the downhole tool. In some embodiments, the geological feature is a crack or fracture in the earth formation. In some embodiments, the instrumented engagement element is on a blade of the downhole tool.

In some embodiments, a method of imaging an earth formation includes identifying engagement data corresponding to an engagement with a borehole in the earth formation; identifying rotation data from a rotation sensor, the rotation data corresponding to a rotational orientation of the engagement data with respect to the borehole; mapping the engagement data to the rotation data to generate oriented engagement data; and generating an image of the borehole based on the oriented engagement data, wherein the image presents the engagement data with respect to the rotation data and wherein the image illustrates one or more geological features of the earth formation. In some embodiments, a method of imaging an earth formation includes identifying, from a depth sensor, depth data corresponding to a depth of engagement data with respect to a surface of the borehole, wherein generating the image is further based on mapping-oriented engagement data to the depth data, and wherein the image illustrates the oriented engagement data with respect to the depth data. In some embodiments, a method of imaging an earth formation includes identifying second engagement data from a second engagement sensor, the second engagement data corresponding to an engagement with the borehole; identifying second rotation data from the rotation sensor, the second rotation data corresponding to a second rotational orientation of the second engagement data with respect to the borehole; and mapping the second engagement data to the second rotation data to generate second oriented engagement data, wherein generating the image of the borehole is based on the oriented engagement data and the second oriented engagement data. In some embodiments, generating the image includes generating supplemental oriented engagement data by interpolating from the oriented engagement data and the second oriented engagement data. In some embodiments, the instrumented engagement element corresponds to a first radius of the downhole tool and the second instrumented engagement element corresponds to a second radius of the downhole tool.

In some embodiments, a method of mapping an earth formation includes identifying engagement data corresponding with a borehole in the earth formation; identifying rotation data from a rotation sensor, the rotation data corresponding to a rotational orientation of the engagement data with respect to the borehole; mapping the engagement data to the rotation data to generate oriented engagement data; and determining a geological feature of the earth formation based on mapping the oriented engagement data to a global reference frame. In some embodiments, a method of mapping an earth formation includes identifying depth data from a depth sensor, the depth data corresponding to a depth of the engagement data with respect to a surface of the borehole, wherein determining the geological feature is further based on mapping the oriented engagement data to the depth data. In some embodiments, the rotation sensor includes one or more of a magnetometer, an inclinometer, and a gyroscope.

In some embodiments, in a downhole drilling environment, a computer-implemented method of mapping an earth formation for the downhole drilling environment is described. The computer-implemented method includes identifying engagement data corresponding to an engagement with a borehole in the earth formation; identifying rotation data from a rotation sensor, the rotation data corresponding to a rotational orientation of the engagement data with respect to the borehole; mapping the engagement data to the rotation data to generate oriented engagement data; and transmitting the oriented engagement data to a drilling device.

In some embodiments, a method of determining a geological feature of an earth formation includes receiving sensor data corresponding to an engagement with a borehole of the earth formation; defining a data feature in the sensor data; and determining a geological feature of the earth formation based on identifying a plurality of instances of the data feature that each occur periodically with respect to a rotation of the downhole tool. In some embodiments, the downhole sensor is implemented on an instrumented engagement element of a downhole tool and the engagement data corresponds to an engagement of the instrumented engagement element with the borehole. In some embodiments, the downhole sensor is an engagement sensor and the sensor data is engagement data.

In some embodiments, a method of mapping an earth formation includes identifying first engagement data corresponding to a first engagement with a borehole in the earth formation; identifying second engagement data corresponding to a second engagement with the borehole; and mapping the first engagement data to the second engagement data to generate mapped engagement data. In some embodiments, the first engagement data is received from a first engagement sensor. In some embodiments, the second engagement data is received from a second engagement sensor. In some embodiments, the first engagement sensor is included on a first instrumented engagement element implemented on a downhole tool. In some embodiments, the second engagement sensor is included on a second instrumented engagement element implemented on a downhole tool. In some embodiments, the second engagement sensor is included on the first instrumented engagement. In some embodiments, the first engagement data is first engagement data and wherein the second engagement data is second engagement data.

In some embodiments, a method of identifying a geothermal reservoir of an earth formation includes receiving engagement data corresponding to an engagement with a borehole of the earth formation; receiving environment data from an environment sensor, wherein the environment data corresponds to a downhole environment of the engagement data; and mapping the engagement data to the environment data to generate mapped engagement data. In some embodiments, a method of identifying a geothermal reservoir of an earth formation includes identifying a geothermal reservoir of the earth formation based on the mapped engagement data. In some embodiments, a method of identifying a geothermal reservoir of an earth formation includes determining a geological feature based on the engagement data and wherein identifying the geothermal reservoir of the earth formation is based on mapping the environment data to the geological feature. In some embodiments, the geological feature is a crack or a fracture in the earth formation. In some embodiments, the environment data includes one or more of a downhole pressure associated with the engagement data and a downhole temperature associated with the engagement data. In some embodiments, the geothermal reservoir of the earth formation is identified based on detecting a change in the environment data. In some embodiments, the change in the environment data is one or more of an increase in a downhole temperature and an increase in a downhole pressure.

In some embodiments, a method of determining a geological feature of an earth formation, includes receiving sensor data corresponding to an engagement with a borehole of the earth formation; defining a data feature in the sensor data; and determining a bedding plane of the earth formation based on identifying a plurality of instances of the data feature that each occur periodically with respect to a rotation of the downhole tool, wherein the bedding plane has a formation dip. In some embodiments, a force on an instrumented engagement element is associated with the engagement with the borehole, and wherein the sensor data is associated with the force. In some embodiments each of the plurality of instances of the data feature occurs on successive revolutions of a downhole tool. In some embodiments, the data feature occurs once per revolution of a downhole tool. In some embodiments, the bedding plane is transversely isotropic. In some embodiments, the downhole tool engages the bedding plane at an angle relative to the formation dip and wherein the angle is substantially not 90. In some embodiments, the data feature corresponds to a parallel engagement of an instrumented engagement element with the bedding plane. In some embodiments, determining the bedding plane includes identifying that the data feature occurs twice per revolution of a downhole tool. In some embodiments, determining a dip direction of the formation dip associated with a diameter defined between the two occurrences per revolution of the data feature. In some embodiments, the data feature corresponds to a transverse engagement of the instrumented engagement element with the bedding plane. In some embodiments, the sensor data is unit agnostic.

In some embodiments, a method of determining downhole dynamics of a drilling system, includes receiving engagement data corresponding to an engagement with a borehole of an earth formation; and detecting a downhole dynamic of the downhole tool based on identifying a data feature in the engagement data. In some embodiments, the downhole dynamic is one or more of whirl or stick slip of the downhole tool. In some embodiments, a drilling parameter of the drilling system is adjusted based on detecting the downhole dynamic. In some embodiments, a drilling parameter of the drilling system is adjusted based on detecting one or more additional measurements. In some embodiments, the one or more additional measurements include acceleration and/or temperature measurements.

In some embodiments, a method of determining downhole dynamics of a drilling system, includes receiving first engagement data corresponding to a first engagement with a borehole of an earth formation; receiving second engagement data corresponding to a second engagement with the borehole; and mapping the first engagement data to the second engagement data to generate mapped engagement data. In some embodiments, a method of determining downhole dynamics of a drilling system, includes determining a downhole dynamic of the downhole tool based on the mapped engagement data. In some embodiments, a method of determining downhole dynamics of a drilling system, includes adjusting a drilling parameter of the drilling system based on determining the downhole dynamic. In some embodiments, a method of determining downhole dynamics of a drilling system, includes determining the downhole dynamic is further based on a bit-rock interaction model. In some embodiments, the bit-rock interaction model includes a friction phase, a production phase, and a founder phase to represent a behavior of the downhole tool. In some embodiments, the downhole dynamic includes a relationship between a rate of penetration of the downhole tool and a weight on bit of the downhole tool. In some embodiments, the relationship is a piecewise linear relationship. In some embodiments, the first engagement data and the second engagement data each include two-axis force data. In some embodiments, the two-axis force data includes normal force data and shear force data. In some embodiments, the first engagement data and the second engagement data each include geometry data. In some embodiments, the geometry data includes depth of cut data and groove area data. In some embodiments, the mapping includes adjusting the first engagement data to compensate for wear of the first instrumented engagement element. In some embodiments, the mapping includes aligning a first line of best fit of the first engagement data and a second line of best fit of the second engagement data.

The embodiments of the borehole imaging techniques have been primarily described with reference to wellbore drilling operations; the borehole imaging techniques described herein may be used in applications other than the drilling of a wellbore. In other embodiments, the borehole imaging techniques according to the present disclosure may be used outside a wellbore or other downhole environment used for the exploration or production of natural resources. For instance, the borehole imaging techniques of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of identifying a geothermal reservoir of an earth formation, the method comprising:

collecting, with one or more sensors of an instrumented engagement element located at a drill bit, while drilling a borehole of the earth formation, engagement data corresponding to an engagement of the instrumented engagement element with a wall of the borehole, wherein the engagement data includes measurements taken over portions of the wall of the borehole as the instrumented engagement element rotates with the drill bit, and wherein the engagement data includes engagement data measured at a plurality of depths in a wellbore;

receiving, at a downhole imaging system, the engagement data from the instrumented engagement element;

collecting, with one or more environment sensors, environment data, wherein the environment data includes measurements of a downhole environment at the plurality of depths;

receiving, at the downhole imaging system, the environment data from the one or more environment sensors, wherein the environment data includes at least one of: downhole pressure, downhole fluid flow, or downhole temperature at the plurality of depths;

mapping, at the downhole imaging system, the engagement data to the environment data to generate mapped engagement data, wherein the mapping includes associating the engagement data at the respective depths of the plurality of depths to the corresponding environment data at the respective depths;

identifying the geothermal reservoir and one or more geological features of the geothermal reservoir based on the mapped engagement data, wherein at least one of the one or more geological features is a crack or a fracture in the earth formation, wherein identifying the geothermal reservoir and the one or more geological features is based on detecting a change in the environment data, and wherein the change in the environment data is at least one of an increase in the downhole temperature or an increase in the downhole pressure;

determining one or more adjusted drilling parameters based on the identified geothermal reservoir and the one or more geological features of the geothermal reservoir; and drilling the borehole based on the adjusted drilling parameters.

2. The method of claim 1, wherein identifying the geothermal reservoir of the earth formation is further based on a mapping of the environment data to the one or more geological features.

3. The method of claim 1, further comprising:

defining a data feature in at least one of the engagement data, the environment data, or the mapped engagement data; and determining a bedding plane of the earth formation based on identifying one or more instances of the data feature that occurs with respect to the rotation of the drill bit, wherein the data feature occurs each period with respect to a plurality of rotations of the drill bit, and wherein the bedding plane has a formation dip.

4. The method of claim 3, wherein the engagement data includes force on the instrumented engagement element, the force being associated with the engagement of the instrumented engagement element with the wall of the borehole.

5. The method of claim 3, wherein each of the one or more instances of the data feature occurs on successive revolutions of the drill bit.

6. The method of claim 3, wherein the data feature occurs once per revolution of the drill bit.

7. The method of claim 3, wherein the bedding plane is transversely isotropic.

8. The method of claim 3, wherein the drill bit engages the bedding plane at an angle relative to the formation dip, and wherein the angle is substantially not 90°.

9. The method of claim 3, wherein the data feature corresponds to a parallel engagement of the instrumented engagement element with the bedding plane.

10. The method of claim 9, wherein determining the bedding plane includes identifying that the data feature occurs twice per revolution of the drill bit.

11. The method of claim 10, further comprising determining a dip direction of the formation dip associated with a diameter defined between the two occurrences per revolution of the data feature.

12. The method of claim 3, wherein the data feature corresponds to a transverse engagement of the instrumented engagement element with the bedding plane.

13. The method of claim 3, wherein the mapped engagement data is unit agnostic.

14. The method of claim 1, wherein the engagement data includes at least one of: force, pressure, temperature, strain, displacement, deformation, stress, or deflection associated with the engagement of the instrumented engagement element with the wall of the borehole.

15. The method of claim 1, wherein at least one of the downhole imaging system or the one or more environment sensors is located on the drill bit.

16. The method of claim 1, wherein the instrumented engagement element is located on a cutting blade of the drill bit.

17. The method of claim 16, wherein the engagement data includes engagement data measured with a plurality of instrumented engagement elements, and wherein the plurality of instrumented engagement elements are located on different cutting blades of the drill bit.

18. The method of claim 1, wherein:

the engagement data includes at least one of: force, pressure, temperature, strain, displacement, deformation, stress, or deflection associated with the engagement of the instrumented engagement element with the wall of the borehole;

the instrumented engagement element is located on a cutting blade of the drill bit;

the engagement data includes engagement data measured with a plurality of instrumented engagement elements;

the plurality of instrumented engagement elements are located on different cutting blades of the drill bit;

at least one of: the downhole imaging system or the one or more environment sensors is located on the drill bit; and at least one of the one or more geological features is a crack or a fracture of the earth formation.

19. The method of claim 1, further comprising generating a photographical image based on the mapping of the engagement data to the environment data, wherein the identifying the one or more geological features includes identifying at least one of: a location, orientation, size, or presence of the one or more geological features based on the photographical image.

* * * * *